United States Patent
Lu et al.

(10) Patent No.: US 10,761,232 B2
(45) Date of Patent: Sep. 1, 2020

(54) VECTOR DENOISING METHOD FOR MULTICOMPONENT SEISMIC DATA

(71) Applicant: China University of Geosciences (Beijing), Beijing (CN)

(72) Inventors: Jun Lu, Beijing (CN); Yun Wang, Beijing (CN)

(73) Assignee: CHINA UNIVERSITY OF GEOSCIENCES (BEIJING), Beijing (CN)

( * ) Notice: Subject to any disclaimer, the term of this patent is extended or adjusted under 35 U.S.C. 154(b) by 283 days.

(21) Appl. No.: 15/944,713

(22) Filed: Apr. 3, 2018

(65) Prior Publication Data

US 2019/0094400 A1 Mar. 28, 2019

(30) Foreign Application Priority Data

Sep. 22, 2017 (CN) .......................... 2017 1 08674044

(51) Int. Cl.
  *G01V 1/36* (2006.01)
  *G01V 1/18* (2006.01)

(52) U.S. Cl.
  CPC .............. *G01V 1/364* (2013.01); *G01V 1/36* (2013.01); *G01V 1/181* (2013.01);
  (Continued)

(58) Field of Classification Search
  CPC .............. G01V 1/364; G01V 2210/32; G01V 2210/324; G01V 2210/3246; G01V 1/181; G01V 1/36
  See application file for complete search history.

(56) References Cited

U.S. PATENT DOCUMENTS

| 7,609,794 B2* | 10/2009 | Reznik | H04B 1/71052 375/267 |
| 2006/0103892 A1* | 5/2006 | Schulze | G06K 9/40 358/463 |

(Continued)

FOREIGN PATENT DOCUMENTS

| CN | 101893720 A | 11/2010 |
| CN | 101937100 A | 1/2011 |
| CN | 104597499 A | 5/2015 |

OTHER PUBLICATIONS

Wang et al, Multicomponent seismic noise attenuation with multivariate order statistic filters (Year: 2016).*
Google scholar search string.*

*Primary Examiner* — Gregory J Toatley, Jr.
*Assistant Examiner* — Lynda Dinh
(74) *Attorney, Agent, or Firm* — NZ Carr Law Office

(57) ABSTRACT

The present disclosure provides a vector denoising method for the multicomponent seismic data, including: obtaining a wave vector of the multicomponent seismic data; calculating a first mean wave vector for the multicomponent seismic data by applying a first moving window, performing a median filtering for the first mean wave vector to obtain a true modulus of the ground roll, subtracting the wave vector of the ground roll from the multicomponent seismic data to obtain a vector time-series; performing a mean filtering for the vector time-series by using a second moving window to obtain a second mean wave vector, performing a median filtering and performing a median the median filtering within the same receiving line for the second mean wave vector to suppress the wave vector of the random noise in the vector time-series, thereby obtaining a wave vector of a purified effective signal.

6 Claims, 37 Drawing Sheets

(52) U.S. Cl.
CPC .... *G01V 2210/242* (2013.01); *G01V 2210/32* (2013.01); *G01V 2210/324* (2013.01)

(56) References Cited

U.S. PATENT DOCUMENTS

| | | | |
|---|---|---|---|
| 2008/0080754 A1* | 4/2008 | Barbu | A61B 6/12 382/128 |
| 2010/0322032 A1 | 12/2010 | Shin | |
| 2014/0288843 A1* | 9/2014 | De Meersman | G01V 1/364 702/17 |

* cited by examiner

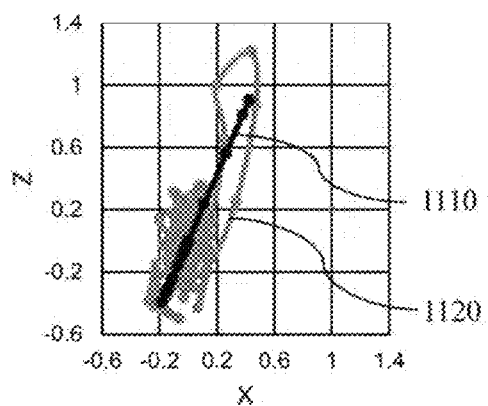 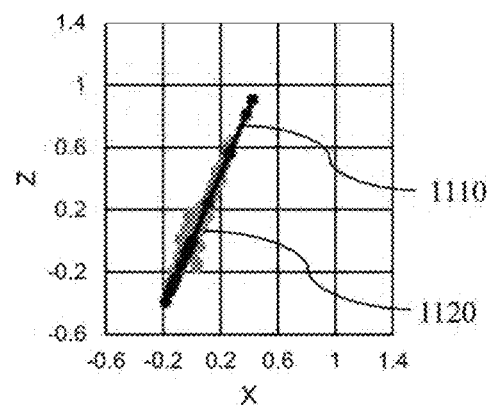
FIG. 11a  FIG. 11b
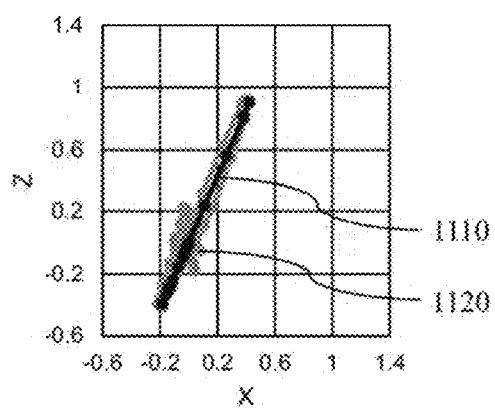 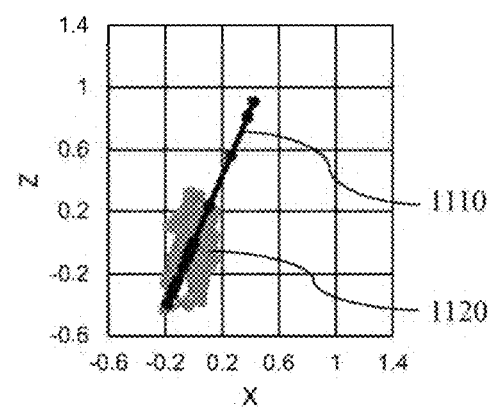
FIG. 11c  FIG. 11d

VECTOR DENOISING METHOD FOR MULTICOMPONENT SEISMIC DATA

CROSS REFERENCE TO RELATED APPLICATION

This application claims the priority benefit of Chinese Patent Application 2017108674044, titled "VECTOR DENOISING METHOD FOR MULTICOMPONENT SEISMIC DATA," filed Sep. 22, 2017, the entire contents of which are incorporated herein by reference.

BACKGROUND

Technical Field

The present disclosure is related to seismic exploration technical field, and more particular to a vector denoising method for multicomponent seismic data.

Related Art

Multicomponent geophones can fully record the spatial particle motions of elastic wavefields. Making full use of the vector amplitude information of the elastic wavefield facilitates subsequent reservoir prediction and fluid detection. Therefore, it is important to maintain the wave vector information of the elastic wavefield during multicomponent data processing. To avoid loss of the fidelity of effective seismic signals, multicomponent seismic acquisition usually adopts a single-point non-combination receiving mode, which also results in a lower signal-to-noise ratio (S/N) for the multicomponent seismic data.

Many existing denoising methods can be directly applied to multicomponent seismic data to improve S/N; however, most methods are for single component data. The application of the denoising methods is subject to the energy and S/N of the effective signals. In most cases, the vertical Z-component has the highest S/N, while the horizontal component has relatively poor S/N. Therefore, changes in filter parameters and changes in signal and noise on each component result in insignificance of the conventional denoising methods to some extent for maintaining vector amplitude information. Therefore, maintaining vector amplitude information during denoising remains a challenge to multicomponent seismic data processing.

Polarization filtering is one of the methods that separates the effective signals from the noise by using the vector amplitude measured on three-component (3C) records. Polarization filtering has been studied for decades with most studies based on bandpass filters with certain ellipticity or direction. For such filtering methods, it is often assumed that ground roll tends to appear elliptical polarization in the vertical plane, while body waves are linearly polarised in three-dimensional space and random noise is unpolarised. Effective signals are separated from the noise background based on the predefined polarization attributes such as ellipticity or polarization direction.

Polarization attributes are usually derived in the time domain or in the frequency (or the time-frequency) domain. In the time domain, most techniques are based on an eigenanalysis of the constructed data matrix within a given moving time window over two-component (2C) or 3C data. One can determine the polarization type according to the semi-major and semi-minor axes of the polarization trajectory given by the eigenvalues of the data covariance matrix or by the eigen images of SVD on the data matrix. The success of these techniques depends on the selection of the moving window, which is affected by dominant period, S/N, and polarization type. The problem faced by polarization filtering in the time domain is that it is difficult to decompose the effective signals and noise arriving the same tine window at the same time.

SUMMARY

The disclosure provides a vector denoising method for multicomponent seismic data to solve the problem that it is difficult in the prior art to decompose the effective signals and noise arriving in the same time window at the same time.

An embodiment of the present disclosure provides a vector denoising method for multicomponent seismic data, which includes: obtaining a wave vector of the multicomponent seismic data, wherein the wave vector of the multicomponent seismic data includes a composite vector having an effective signal, a ground roll wave and a random noise; calculating a first mean wave vector for the wave vector of the multicomponent seismic data by applying a first moving window, performing a median filtering for the first mean wave vector to obtain a true modulus of the ground roll wave, and subtracting the true modulus of the ground roll wave from the wave vector of the multicomponent seismic data to obtain a vector time-series; and performing a mean filtering for the vector time-series by using a second moving window to obtain a second mean wave vector, and performing a median filtering for the second mean wave vector and performing a median the median filtering for the second mean wave vector within the same receiving line to suppress the wave vector of the random noise in the vector time-series, thereby obtaining a wave vector of a purified effective signal vector.

According to a technical solution of the present disclosure, the disclosure involves calculating a first mean wave vector for the wave vector of the multicomponent seismic data by applying a first moving window, performing a median filtering for the first mean wave vector to obtain a true modulus of the ground roll wave, and subtracting the true modulus of the ground roll wave from the wave vector of the multicomponent seismic data to obtain a vector time-series and performing a mean filtering for the vector time-series by using a second moving window to obtain a second mean wave vector, and performing a median filtering for the second mean wave vector and performing a median the median filtering for the second mean wave vector within the same receiving line to suppress the wave vector of the random noise in the vector time-series, thereby obtaining a wave vector of a purified effective signal vector. Therefore, under the situation without relying on ellipticity and directionality, and without requiring setting up any kind of data covariance matrices or complex traces, the noise in the wave vector of the multicomponent seismic data may be greatly suppressed without damaging the high and low frequencies of the effective signal.

BRIEF DESCRIPTION OF THE DRAWINGS

The figures described herein are to provide a further understanding of the present disclosure and constitute a part of the present disclosure. The exemplary embodiments of the present disclosure and descriptions thereof are used to explain the present disclosure, and do not constitute improper limits to the present disclosure. In the figures:

FIG. 11a is a vector diagram of the separated effective signal and random signal according to the embodiment of the present disclosure;

FIG. 11b is a vector diagram of the unscaled effective signal after the random noise attenuation according to the embodiment of the present disclosure;

FIG. 11c is a vector diagram of the scaled effective signal after the random noise attenuation according to the embodiment of the present disclosure;

FIG. 11d is a vector diagram of the filtered random noise according to the embodiment of the present disclosure.

DETAILED DESCRIPTION

In order to make the objects, technical solutions and advantages of the present disclosure more apparent, the present disclosure is further be described in details with reference to the accompanying drawings and specific examples.

In a three-dimensional (3D) 3C seismic exploration, the measured 3C data are recorded by one vertical (Z−) component and two horizontal (R− and T−) components of the geophone simultaneously, wherein R component is the same as the azimuth of the seismic source to the geophone and T component is located at the orthogonal direction of the seismic source to the geophone. The 3C amplitudes $a_Z$, $a_R$ and $a_T$ at the same time t form a signal vector, as shown in Equation (1):

$$A(t)=a_Z(t)e_Z+a_R(t)e_R+a_T(t)e_T \quad (1)$$

wherein A(t) denotes an independent wave vector, which does not reflect the true wave vector characteristics owing to the existence of different noise, such as ground roll, random noise and other kinds of noise. Rather, A(t) is a composite vector approximately expressed as the following Equation (2):

$$A(t)=B(t)+G(t)+N(t), \quad (2)$$

wherein B(t), G(t) and N(t) denote the wave vectors of the effective signal, the ground roll (ground roll wave) and the random noise (with other noises) at time t respectively, and these wave vectors as shown in Equation (3):

$$\begin{cases} B(t) = B(t)e_B, \\ G(t) = G(t)e_G, \\ N(t) = N(t)e_N, \end{cases} \quad (3)$$

wherein $e_B$, $e_G$ and $e_N$ denote a unit wave vector, and B(t), G(t) and N(t) denote the wave vector moduli.

Through analysis of a 3C record using a moving window, it can derive a mean (or median) vector that characterises the polarization in the moving window. The moving window size can be tailored for different applications and statistics. For instance, a larger moving window can be used to produce the near-zero random-noise vector moduli and relatively accurate instantaneous ground-roll vectors. A smaller moving window can be used to produce the opposite effect. In the embodiment, in the different moving windows, mean (or median) vector is considered to use to reduce the noise in 3C records.

Figure 1:
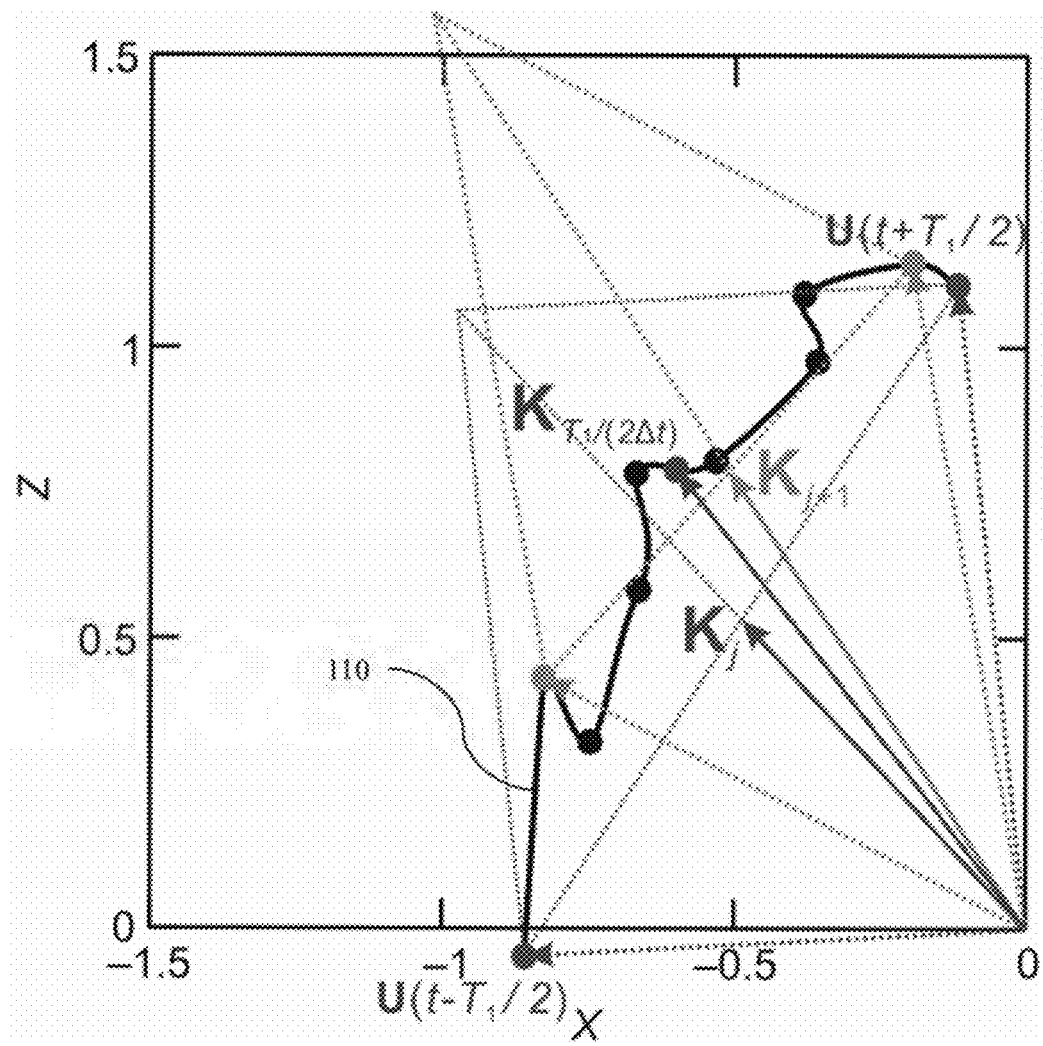
FIG. 1 is a schematic view of a formation of mean wave vector set according to the embodiment of the present disclosure.

The ground roll wave generally propagates close to the surface in low-velocity strata with high-amplitude and low frequency elliptical polarization. To separate the wave vectors on the trajectory of the elliptical particle of the ground roll wave, a large-sapparcale moving time window is added to the 3C record and the median wave vector is calculated from a mean vector set in order to characterize the ground roll polarization. FIG. 1 is a schematic view of a formation of mean wave vector set according to the embodiment of the present disclosure. In FIG. 1, the reference number 110 denotes the motion trajectory of particle (dot) of the ground roll wave. As shown in FIG. 1, within a first moving time window $T_1$, each first mean wave vector $K_j$ may be calculated by the following Equation (4):

$$K_j = \frac{A(t - T_1/2 + j\Delta t) + A(t + T_1/2 - j\Delta t)}{2}, j = 0, \ldots, \frac{T_1}{2\Delta t}, \quad (4)$$

wherein $\Delta t$ denotes a time sampling rate of the seismic data. These first mean vectors form a $1+T_1/(2\Delta t)$ dimensional vector set, wherein each element is close to the true wave vector of the surface sample at the time t. Then, a total distance of one vector to all the other vectors is calculated by the following Equation (5):

$$D(K_j) = \sum_{i=1}^{\frac{T_1}{2\Delta t}} \|K_j - K_i\|. \quad (5)$$

The median vector was derived by a median filter, as shown in Equation (6):

$$M(t)=\mathrm{argmin}(D(K_j)). \quad (6)$$

Figure 2:
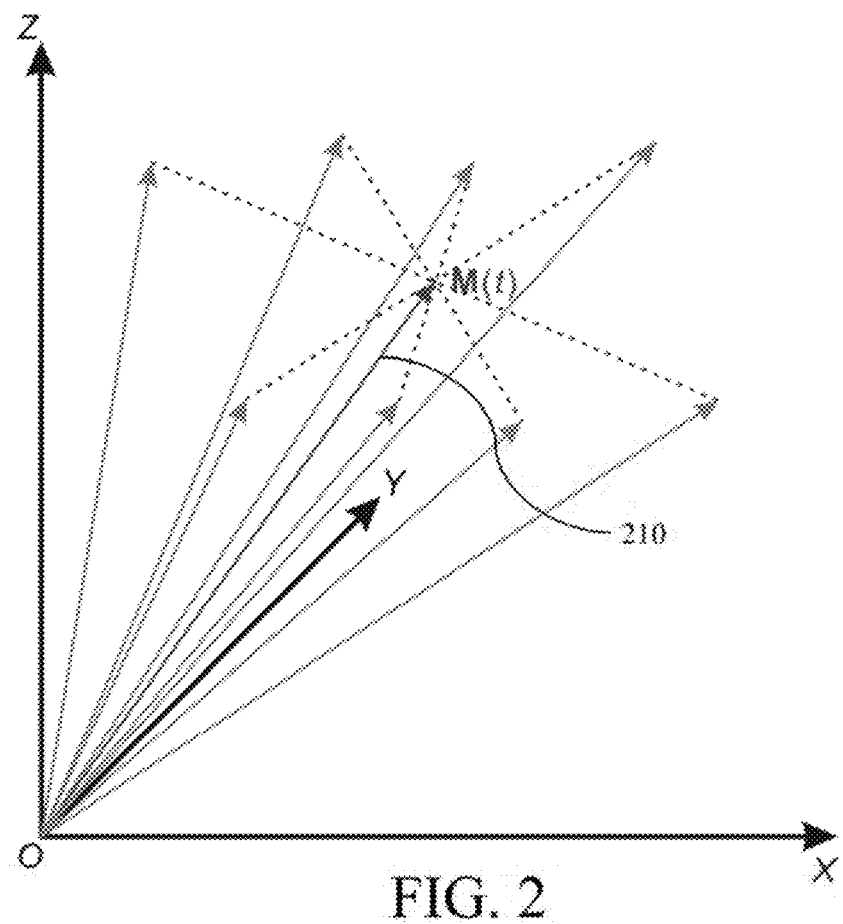
FIG. 2 is a schematic view of the mean wave vector in a 3D space according to the embodiment of the present disclosure.

FIG. 2 is a schematic view of the mean wave vector in a 3D space according to the embodiment of the present disclosure. In FIG. 2, the reference number 210 denotes median vector defined by Equation (6). As shown in FIG. 2, M(t) is located at the centre of the mean vector set and has a minimum distance to all other mean vectors.

The median filter makes that vector modulus is slightly less than a true filter, and it may be recovered through the least squares method given by the following Equation (7):

$$Q(t) = \sum_{\tau=t-T_1/2}^{t+T_1/2} \left( \begin{bmatrix} a_Z(\tau) \\ a_R(\tau) \\ a_T(\tau) \end{bmatrix} - \gamma(t) \begin{bmatrix} m_Z(\tau) \\ m_R(\tau) \\ m_T(\tau) \end{bmatrix} \right)^2, \quad (7)$$

wherein $m_Z$, $m_R$ and $m_T$ are the amplitude projections of the median vector on the Z-, R- and T-components, respectively, $\gamma_1(t)$ is a first scaling factor used to modify the median vector modulus. To minimize the objective function Q(t), it may apply the following Equation (8):

$$\frac{\partial Q(t)}{\partial \gamma_1(t)} = 0. \quad (8)$$

Then, the first scaling factor is derived by the following Equation (9):

$$\gamma_1(t) = \frac{\sum_{\tau=t-T_1/2}^{t+T_1/2} \begin{bmatrix} a_Z(\tau) \\ a_R(\tau) \\ a_T(\tau) \end{bmatrix} \square \begin{bmatrix} m_Z(\tau) \\ m_R(\tau) \\ m_T(\tau) \end{bmatrix}}{\sum_{\tau=t-T_1/2}^{t+T_1/2} \left( \left\| \begin{bmatrix} m_Z(\tau) \\ m_R(\tau) \\ m_T(\tau) \end{bmatrix} \right\| \right)^2}. \qquad (9)$$

wherein $\gamma_1(t)$ denotes the first scaling factor. Therefore, the ground roll vector with a true modulus is denoted by the following Equation (10):

$$G(t)=\gamma_1(t)M(t). \qquad (10)$$

Directly performing subtraction for Equation (10) and Equation (2) (i.e. by subtracting Equation (10) from Equation (2)), it may obtain a vector time-series C(t) of ground-roll-free wave composed of the random noise and the effective signal vector, as shown in Equation (11):

$$C(t)=A(t)-G(t)=B(t)+N(t). \qquad (11)$$

The accurate moving time window length is crucial to the recovery of vector characteristics of the ground roll wave. During the calculation of the median vector for the ground roll wave, the effective signal is processed as noise and random noise. Only when the length of the first moving time window exceeds half of the wave length, the wave vector with larger modulus of the effective signal can be filtered through a median filter. Since when the length of the first moving window is too large, it will cause a large error in the mean wave vector set, the lower limitation of the length of the first moving time window is set as a half of the maximum apparent period of the effective signal, and the length of the first moving time window may also be less than a half of the minimum apparent period of the ground roll wave. In general, the calculation of the median wave vector is insensitive to the upper and lower limitations of the length of the moving window.

In some situations, due to the affect of absorption and attenuation, there is a lot of overlap between the bandwidth of the body-wave and the bandwidth of the ground roll wave. When the moving time window of the ground roll wave is applied, these low-frequency seismic waves may generate a large number of false median vectors. Therefore, the polarization ellipticity is used to distinguish elliptical or linear polarizations and the pseudo median vector is decreased. In the entire moving time window, the wave vector with maximum modulus may be considered as a semi-major axis, and in the direction perpendicular to with the semi-major axis, another wave vector with maximum modulus may be found as the semi-minor axis. If the ratio of the semi-major axis and the semi-minor axis of the particle trajectory is greater than the threshold value, the polarization of the body wave is considered, and the modulus of the current wave vector is set to a minimum value.

Figure 3:
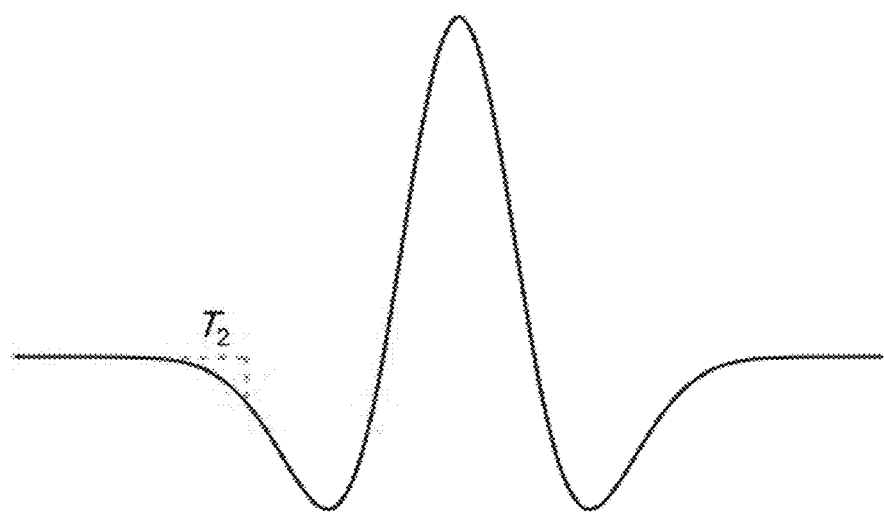
FIG. 3 is a schematic view of the length of the second moving time window set as a quarter of the seismic wavelet sidelobe according to the embodiment of the present disclosure.

Additionally, unlike the ground roll wave, in order to suppress random noise, the smaller time window is used to prevent the main peak of the effective signal from being suppressed. As shown in FIG. 3, the length of the second moving time window $T_2$ may be nearly set as a quarter of the seismic wavelet sidelobe. Within the second moving time window, a three-stage smoothing approach is adopted to purify the body wave vector. In the first stage, the mean filtering is used to get a second mean wave vector $M_1(t)$, as shown in Equation (12):

$$M_1(t) = \frac{1}{T_2+1} \sum_{\tau=t-T_2/2}^{t+T_2/2} C(t), \qquad (12)$$

wherein $T_2$ denotes the second moving time window. The mean filtering superposes all the wave vectors within the second moving time window and takes the mean vector for the centre. The superposition of three wave vectors may highlight the vector characteristics of the body wave and suppress the vector amplitude of the noise.

Figure 4:
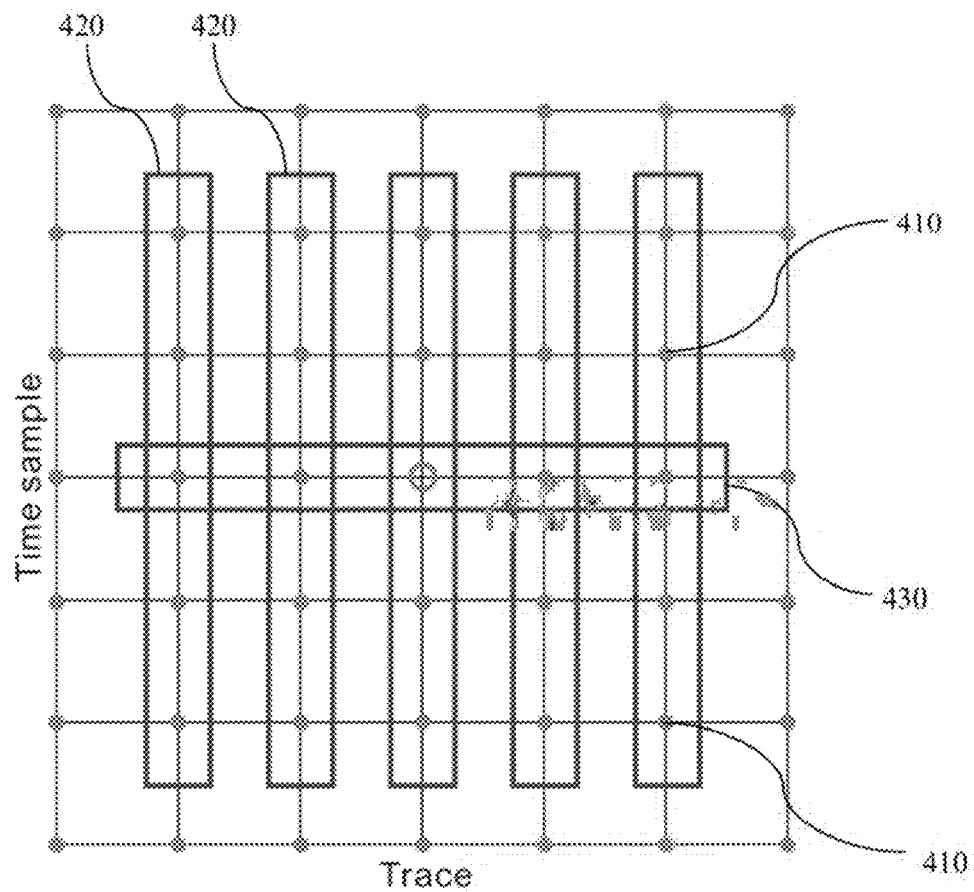
FIG. 4 is a schematic view of moving windows used in median filtering to the wave vectors from shot three-component (3C) records according to the embodiment of the present disclosure.
Figure 5:
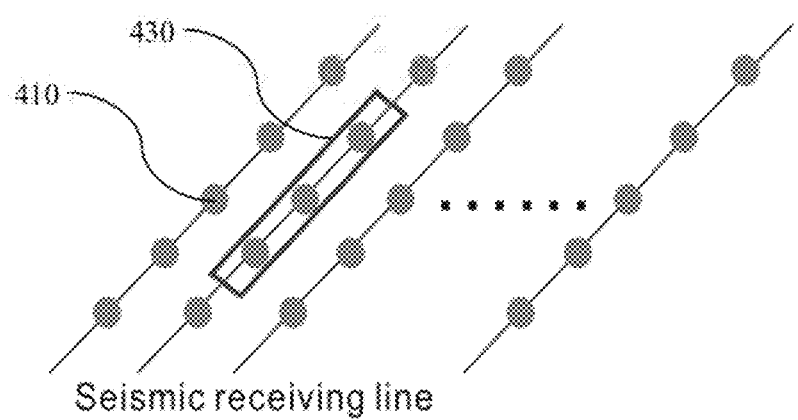
FIG. 5 is a schematic view of the iterative process for solving the parameters of a rectangle according to the embodiment of the present disclosure.

FIG. 4 is a schematic view of moving windows used in median filtering to the wave vectors from shot three-component (3C) records according to the embodiment of the present disclosure. In FIG. 4, the reference number 410 denotes seismic sample points, the reference number 420 denotes the moving windows for the median filtering performed over time, and the reference number 430 denotes the moving windows for the median filtering performed over trace within the same receiving line. As shown in FIG. 4, in the second stage, the median filtering is performed over time at each trace for wave vectors of all second mean wave vectors to suppress the random noise vectors, as shown in Equation (13):

$$M_2(t) = \mathrm{argmin}\left( \sum_{i=t-T_2/(2\Delta t)}^{t+T_2/(2\Delta t)} \|M_{1j} - M_{1i}\| \right), j = t - \frac{T_2}{2\Delta t}, \ldots, t + \frac{T_2}{2\Delta t}, \qquad (13)$$

wherein $M_2(t)$ denotes a wave vector after suppress the random noise vector. Then, in the third stage, the median filtering is performed by using moving trace (the reference number 430 in FIG. 4) within the same receiving line to suppress non-ground-roll related coherent noise, as shown in Equation (14):

$$M_3(k) = \mathrm{argmin}\left( \sum_{i=k-K/(2\Delta k)}^{k+K/(2\Delta k)} \|M_{2j} - M_{2i}\| \right), j = k - \frac{K}{2\Delta k}, \ldots, k + \frac{K}{2\Delta k}, \qquad (14)$$

wherein $M_3(k)$ denotes a wave vector after suppressing the non-ground-roll wave related coherent noise, k denotes an output trace of the median filtering, K denotes a length of a moving trace window of the median filtering. As shown in FIG. 5, the median filtering over trace should be performed within the same seismic receiving line because only adjacent seismic traces in the same receiving line have similar wave vector characteristics. Then, a purified effective signal vector by scaling the median vector $M_3$ through the following Equation (15):

$$B(t)=\gamma_2(t)M_3(t), \qquad (15)$$

$\gamma_2(t)$ denotes a second scaling factor and expressed as the following Equation (16):

$$\gamma_2(t) = \frac{\sum_{\tau=t-T_2/2}^{t+T_2/2} \begin{bmatrix} c_Z(\tau) \\ c_R(\tau) \\ c_T(\tau) \end{bmatrix} \Box \begin{bmatrix} m_{3Z}(\tau) \\ m_{3R}(\tau) \\ m_{3T}(\tau) \end{bmatrix}}{\sum_{\tau=t-T_2/2}^{t+T_2/2} \left( \left\| \begin{bmatrix} m_{3Z}(\tau) \\ m_{3R}(\tau) \\ m_{3T}(\tau) \end{bmatrix} \right\| \right)^2}, \quad (16)$$

wherein $c_Z$, $c_R$ and $c_T$ denote the projections of the wave vectors on Z-, R- and T-component after filtering the ground roll wave respectively, $m_{3Z}$, $m_{3R}$ and $m_{3T}$ denote the projections of the wave vectors on Z-, R- and T-component after suppressing the other non-ground-roll wave related coherent noise, $c_Z e_Z + c_R e_R + c_T e_T = C$, and $m_{3Z} e_Z + m_{3R} e_R + m_{3T} e_T = M_3$. Herein, the second moving time window $T_2$ may be approximately set as approximate one wavelet apparent period.

In the foregoing, the related equations required for the embodiments of the present disclosure are roughly described, and the corresponding embodiments are provided to describe as follows. According to the embodiment of the present disclosure, a vector denoising method for the multicomponent seismic data is provided.

Figure 6:
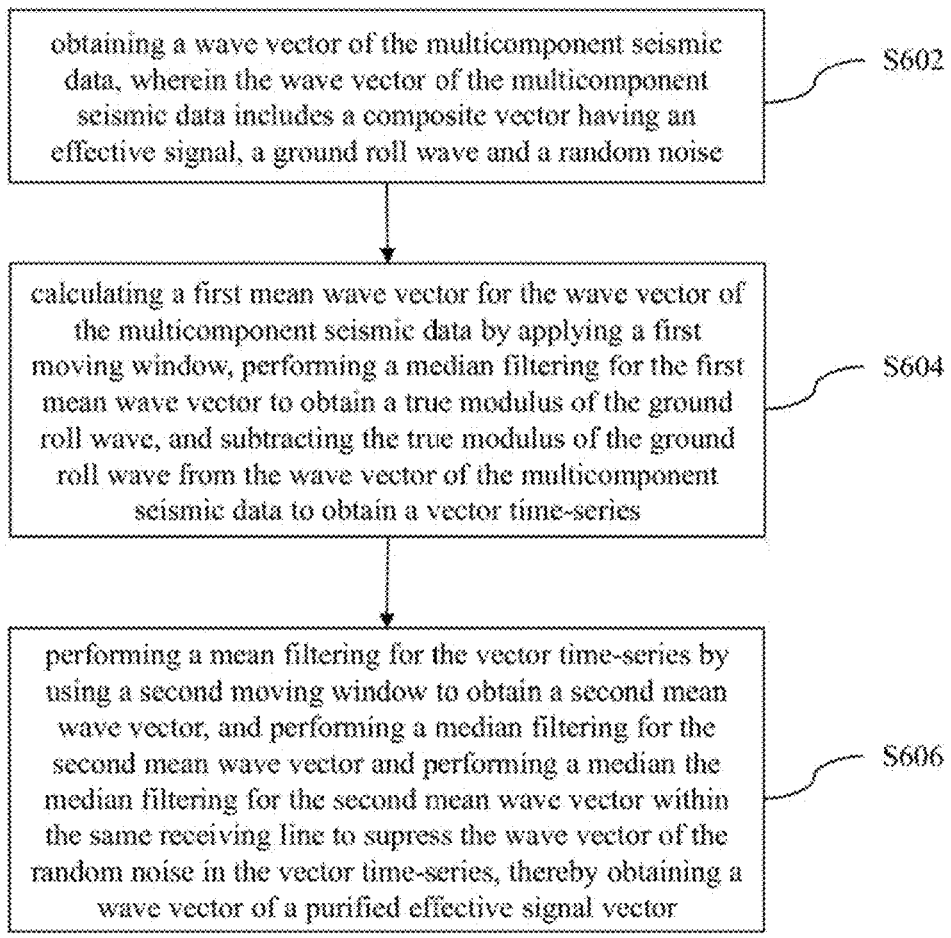
FIG. 6 is a flowchart of a vector denoising method for the multicomponent seismic data according to the embodiment of the present disclosure.

FIG. 6 is a flowchart of a vector denoising method for the multicomponent seismic data according to the embodiment of the present disclosure.

Step S602: obtaining a wave vector of the multicomponent seismic data, wherein the wave vector of the multicomponent seismic data includes a composite vector having an effective signal, a ground roll wave and a random noise; wherein the wave vector of the multicomponent seismic data is shown in Equation (2).

Step S604: calculating a first mean wave vector for the wave vector of the multicomponent seismic data by applying a first moving window, performing a median filtering for the first mean wave vector to obtain a true modulus of the ground roll wave, and subtracting the true modulus of the ground roll wave from the wave vector of the multicomponent seismic data to obtain a vector time-series. In the embodiment, a lower limitation of the length of the first moving time window is a half of a maximum apparent period of the effective signal and the length of the first moving time window is less than a half of a minimum apparent period of the ground roll wave.

Additionally, the first mean wave vector is shown in Equation (4). Performing the median filtering for the first mean wave vector to obtain the true modulus of the ground roll wave may be performed by Equation (5), Equation (6), Equation (7), Equation (8), Equation (9) and Equation (10). Subtracting the true modulus of the ground roll wave from the wave vector of the multicomponent seismic data to obtain a vector time-series is shown in Equation (11).

Step S606: performing a mean filtering for the vector time-series by using a second moving window to obtain a second mean wave vector, and performing a median filtering for the second mean wave vector and performing a median the median filtering for the second mean wave vector within the same receiving line to suppress the wave vector of the random noise in the vector time-series, thereby obtaining a wave vector of a purified effective signal vector. Wherein the second mean wave vector is shown in Equation (12). Performing the median filtering for the second mean wave vector and performing the median the median filtering for the second mean wave vector within the same receiving line may be performed by Equation (13) and Equation (14). The wave vector of the purified effective signal vector is generated by Equation (15) and Equation (16).

Figure 7A:
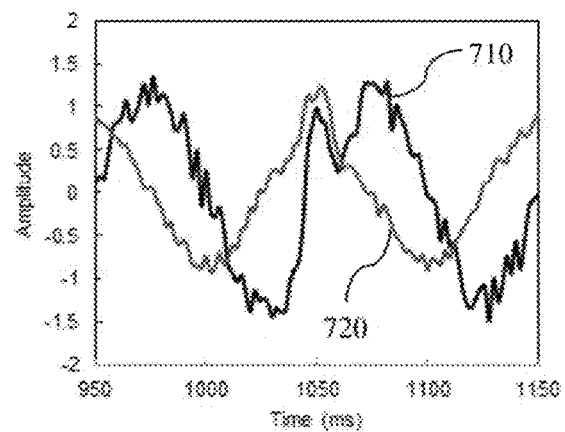
FIG. 7a is a waveform showing the two-component records composed of the seismic signal at 30 Hz dominant frequency adding the 50% random noise and the ground roll wave according the embodiment of to the present disclosure.
Figure 7B:
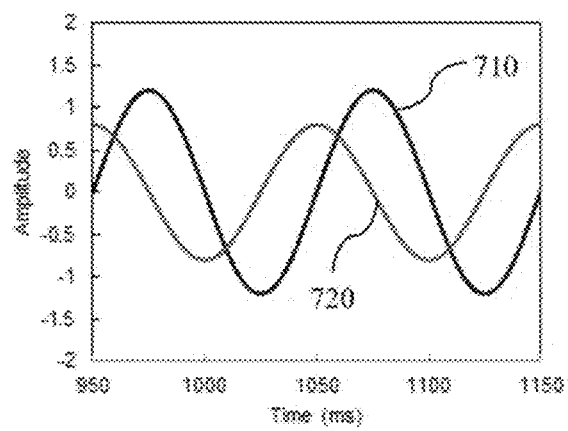
FIG. 7b is a waveform showing the component records composed of the ground roll wave according to the embodiment of the present disclosure.
Figure 7C:
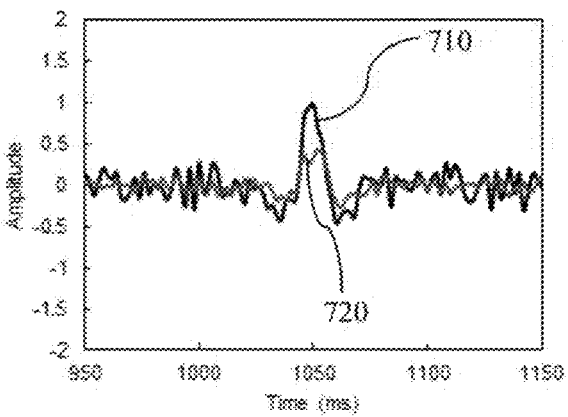
FIG. 7c is a waveform showing the component records composed of the seismic signal at 30 Hz dominant frequency adding the 50% random noise according to the embodiment of the present disclosure.

FIG. 7a is a waveform showing the two-component records composed of the seismic signal at 30 Hz dominant frequency adding the 50% random noise and the ground roll wave according the embodiment of to the present disclosure. FIG. 7b is a waveform showing the component records composed of the ground roll wave according to the embodiment of the present disclosure. FIG. 7c is a waveform showing the component records composed of the seismic signal at 30 Hz dominant frequency adding the 50% random noise according to the embodiment of the present disclosure. In FIG. 7a, FIG. 7b and FIG. 7c, the reference number 710 denotes Z-component, and the reference number 720 denotes R-component. As shown in FIG. 7a, FIG. 7b and FIG. 7c, the synthetic 1D2C records for the test were added by 50% random noise and strong ground roll. It is clear that the apparent periods of the seismic signal and the ground roll were about 40 and 100 ms, respectively.

Figure 8A:
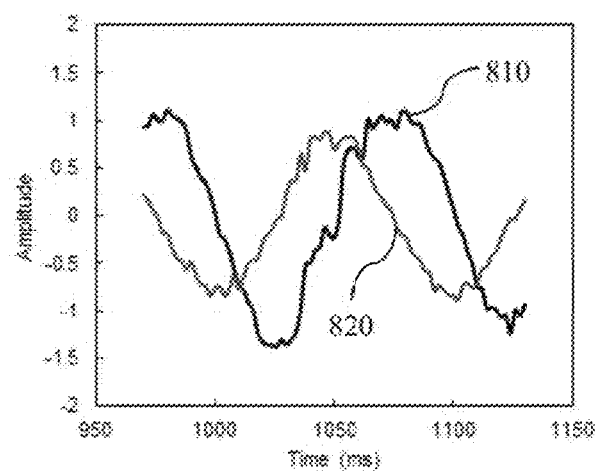
FIG. 8a is a waveform of a separated ground roll wave according to the embodiment of the present disclosure.
Figure 8B:
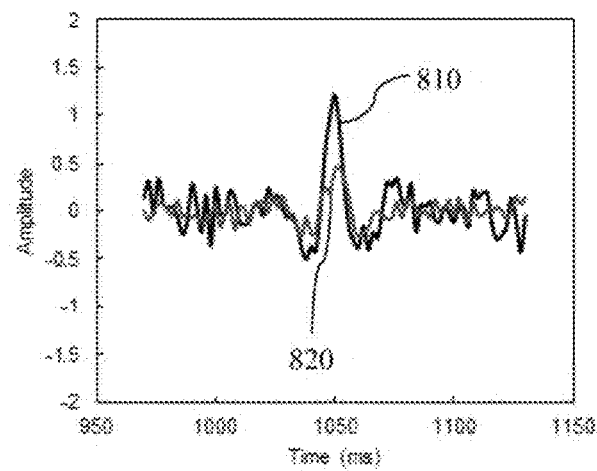
FIG. 8b is a waveform of the effective signal with the random noise according to the embodiment of the present disclosure.

FIG. 8a is a waveform of a separated ground roll wave according to the embodiment of the present disclosure. FIG. 8b is a waveform of the effective signal with the random noise according to the embodiment of the present disclosure. In FIG. 8a and FIG. 8b, the reference number 810 denotes Z-component, and the reference number 820 denotes R-component. As shown in FIG. 8a and FIG. 8b, the 20-ms moving time window is used to separate the ground roll wave (FIG. 8a) and the effective signal with the random noise (FIG. 8b). In FIG. 8a and FIG. 8b, data at the start and end 20 ms could not be filtered because they were located at the start and end borders of the moving time window.

Figure 9A:
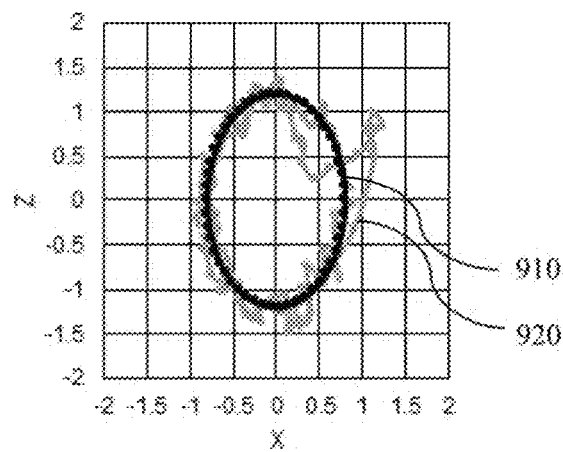
FIG. 9a is a vector diagram of the original two-component records according to the embodiment of the present disclosure.
Figure 9B:
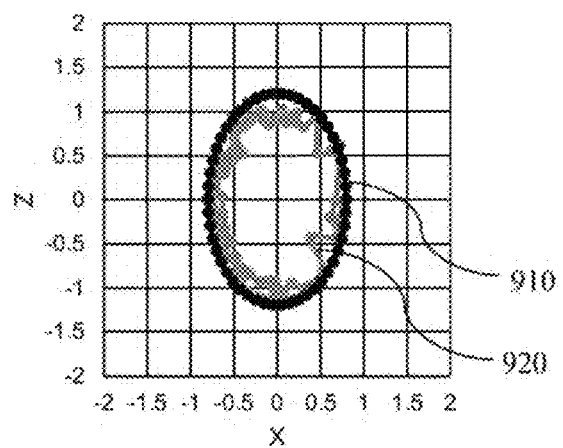
FIG. 9b is a vector diagram of a separated ground roll wave without adopting any scaling factor according the embodiment of to the present disclosure.
Figure 9C:
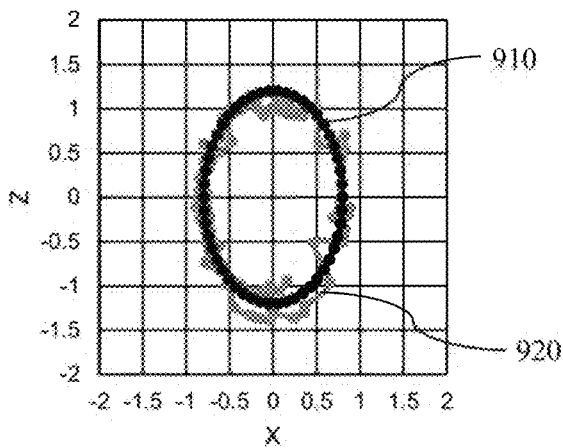
FIG. 9c is a vector diagram of a separated ground roll wave using scaling factor according to the embodiment of the present disclosure.

FIG. 9a is a vector diagram of original two-component records according to the embodiment of the present disclosure. FIG. 9b is a vector diagram of a separated ground roll wave without adopting any scaling factor according to the embodiment of the present disclosure. FIG. 9c is a vector diagram of a separated ground roll wave using scaling factor according to the embodiment of the present disclosure. In FIG. 9a, FIG. 9b and FIG. 9c, the reference number 910 denotes theoretical ground roll wave polarization trajectory, and the reference number 920 denotes true ground roll wave polarization trajectory. The polarization waveforms in FIG. 9a, FIG. 9b and FIG. 9c show that the median filtering effectively improved the ellipticity of the ground roll because the moduli of the wave vectors are reduced. Therefore, the separated ground roll wave without adopting any scaling factor presents a smaller elliptical polarization trajectory (FIG. 9b). However, the time-variant scaling factors can improve the matching of the polarization trajectories between the separated ground roll wave and the true one (FIG. 9c).

Figure 10A:
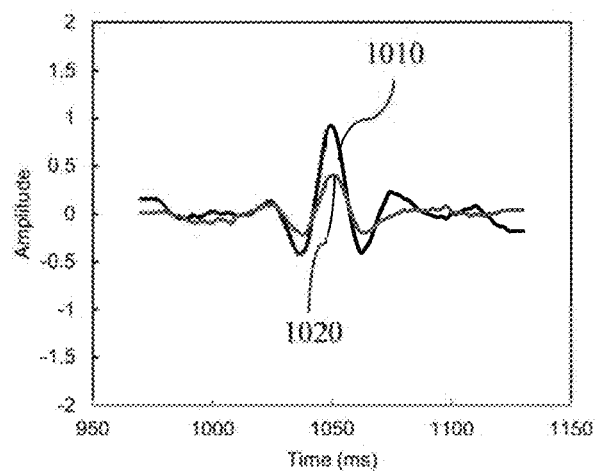
FIG. 10a is a waveform of the seismic signal after attenuating the random noise according to the embodiment of the present disclosure.
Figure 10B:
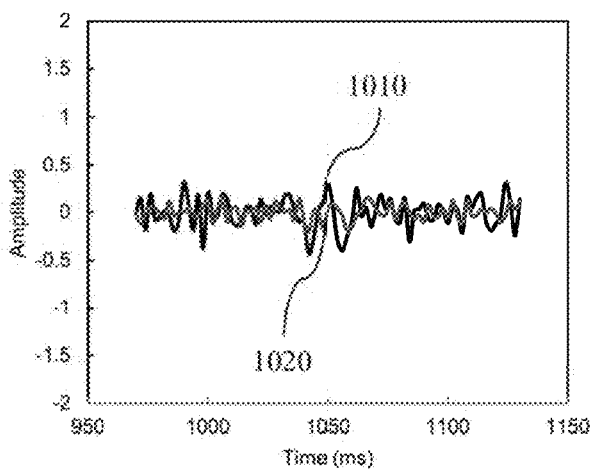
FIG. 10b is a waveform of the filtered random noise.

Then, the three-stage smoothing approach is performed to separate the effective signal (FIG. 10a) and the random noise (FIG. 10b). In FIG. 10a and FIG. 10b, the reference number denotes Z-component, and the reference number 1020 denotes R-component. FIG. 11a is a vector diagram of the separated effective signal and random signal according to the embodiment of the present disclosure. FIG. 11b is a vector diagram of the unscaled effective signal after the random noise attenuation according to the embodiment of the present disclosure. FIG. 11c is a vector diagram of the scaled effective signal after the random noise attenuation according to the embodiment of the present disclosure. FIG. 11d is a vector diagram of the filtered random noise according to the embodiment of the present disclosure. In FIG. 11a, FIG. 11b, FIG. 11c and FIG. 11d, the reference number 1110 denotes theoretical ground roll wave polarization trajectory, and the reference number 920 denotes true ground roll wave polarization trajectory. FIG. 11a, FIG. 11b, FIG. 11c and FIG. 11d show that the vector denoising method of the embodiment can well distinguish the body-wave and random-noise polarizations and recover the linear polarization of the body wave. Comparing FIG. 11b with FIG. 11c, it is clear that selecting appropriate scaling factors from the wave vector modulus of three-stage smoothing can make the vector denoising method of the embodiment more amplitude preserving.

Figure 12A:
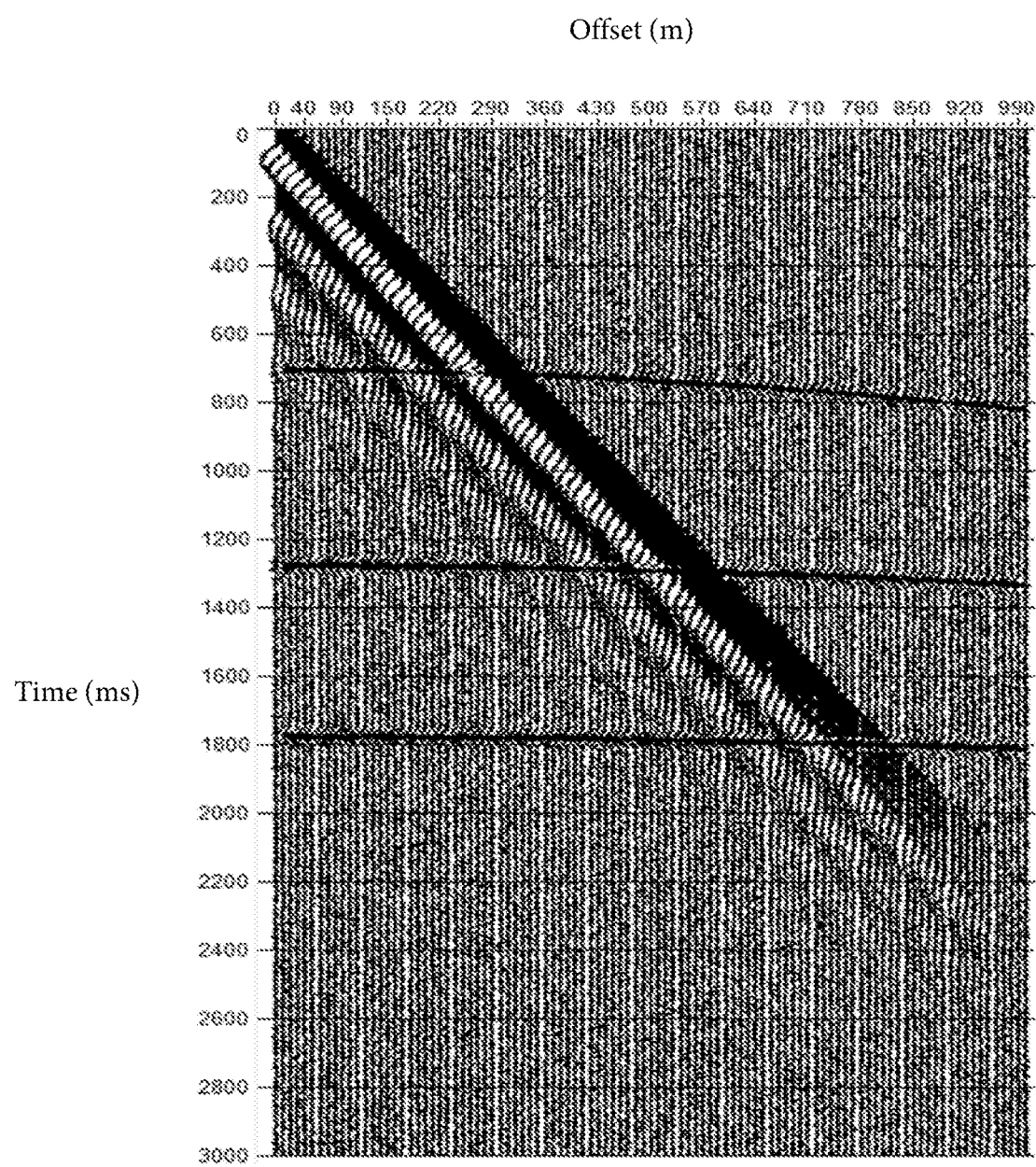
FIG. 12a is a synthetic shot record of Z-component according to the embodiment of the present disclosure.
Figure 12B:
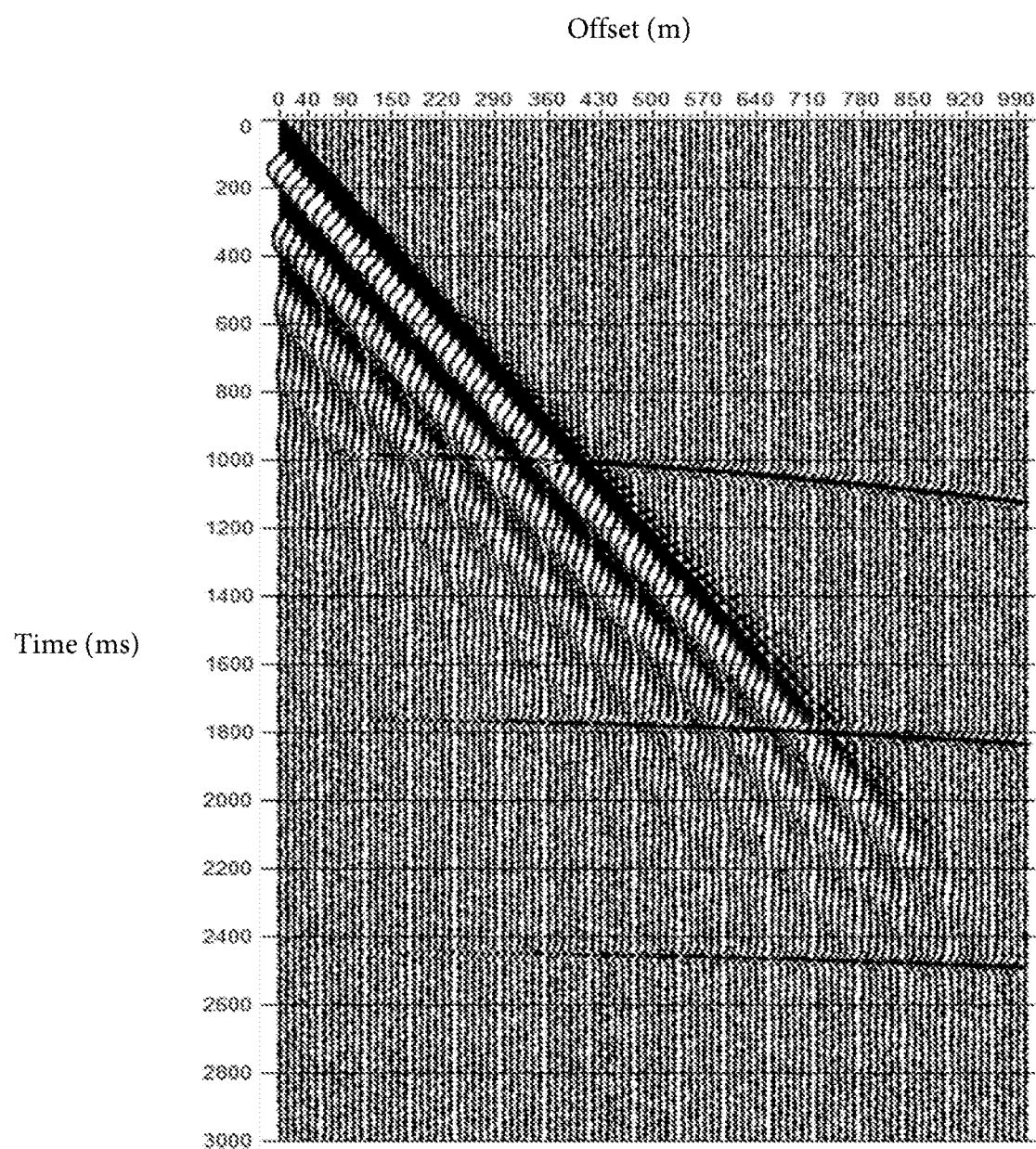
FIG. 12b is a synthetic shot record of R-component according to the embodiment of the present disclosure.
Figure 13A:
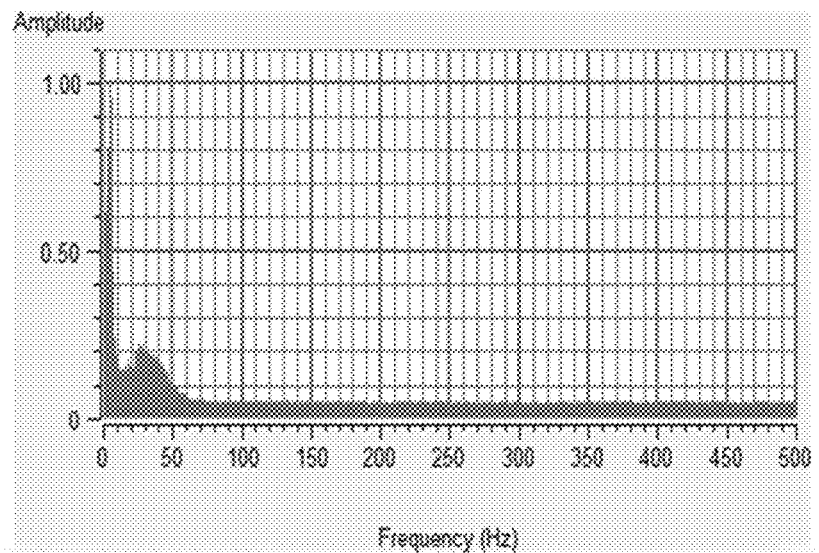
FIG. 13a is a spectrum of the synthetic shot record of Z-component according to the embodiment of the present disclosure.
Figure 13B:
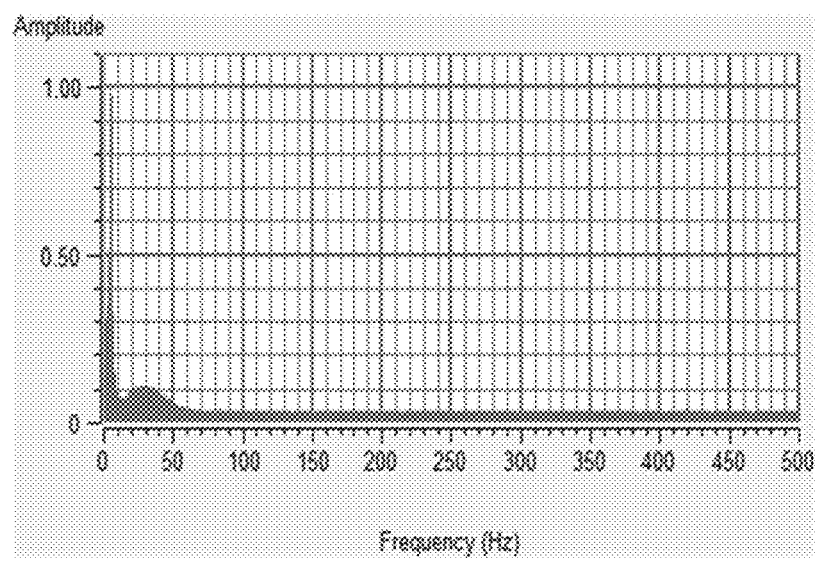
FIG. 13b is a spectrum of the synthetic shot record of R-component according to the embodiment of the present disclosure.

FIG. 12a is a synthetic shot record of Z-component according to the embodiment of the present disclosure. FIG. 12b is a synthetic shot record of R-component according to the embodiment of the present disclosure. The synthetic two-component shot record shown in FIG. 12a and FIG. 12b is used to describe the specific procedure of the vector denoising method. The effective signals of Z-component and R-component are mainly PP-wave and PS-wave, they are synthesized with a 30 Hz Ricker wavelet, the added ground roll wave has obvious dispersion phenomenon, and the cut-off frequency is about 10 Hz (FIG. 13a and FIG. 13b), and the random noise level of the two-component is 200% and the frequency band thereof is 0-500 Hz. Furthermore, the two-component of this test is further added with coherent noise related to non-ground-roll covered by the ground.

Figure 14:
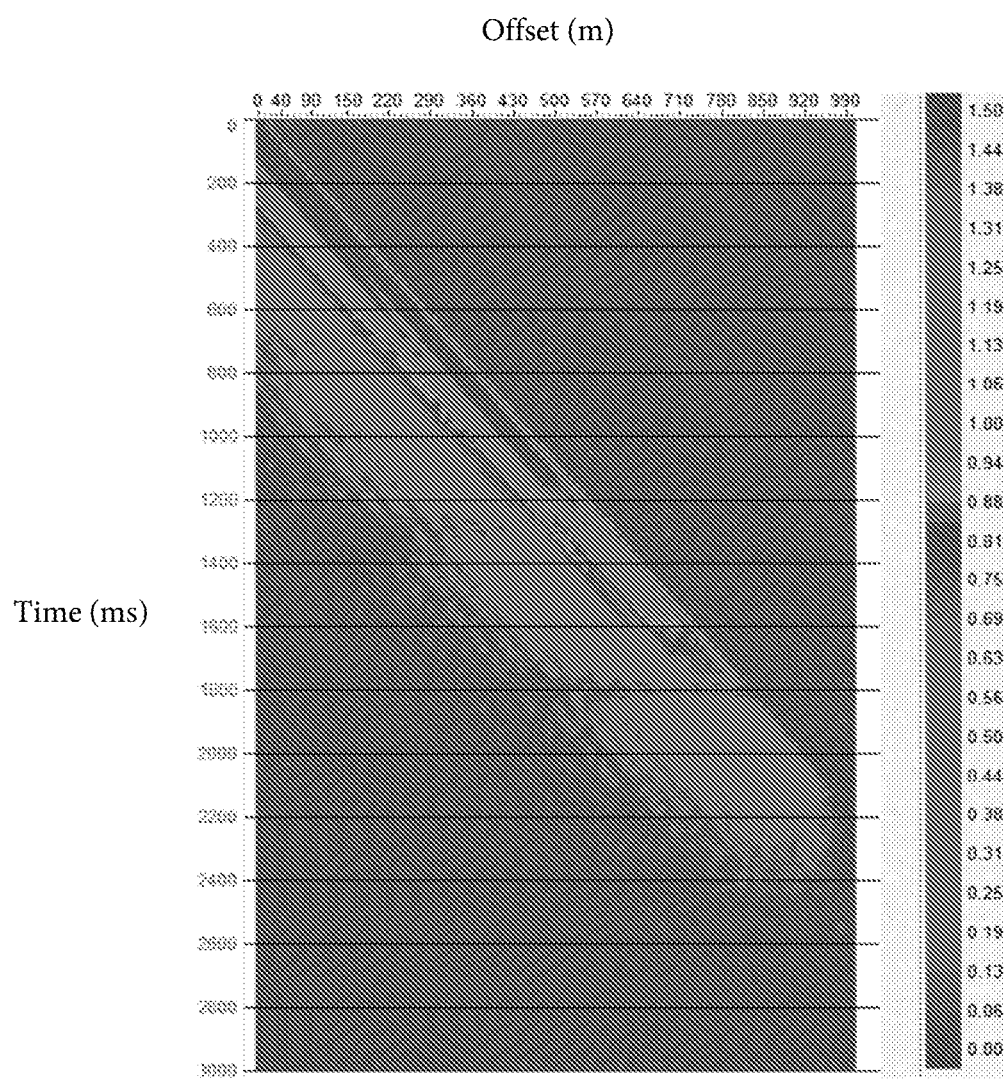
FIG. 14 is a wave vector modulus calculated from the synthetic shot record in 50-ms moving time window according to the embodiment of the present disclosure.
Figure 15A:
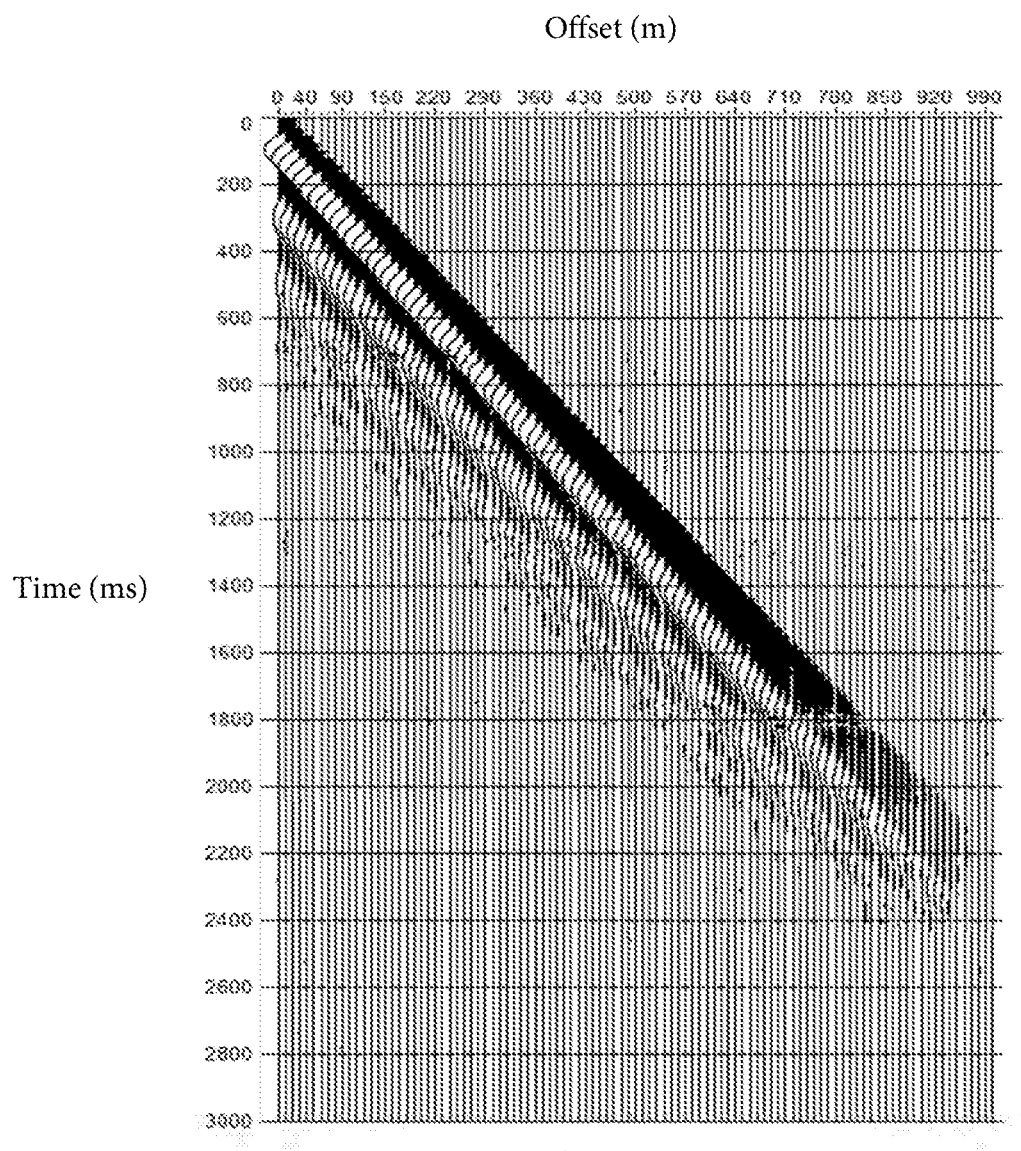
FIG. 15a is a ground roll energy separated from Z-component according to the embodiment of the present disclosure.
Figure 15B:
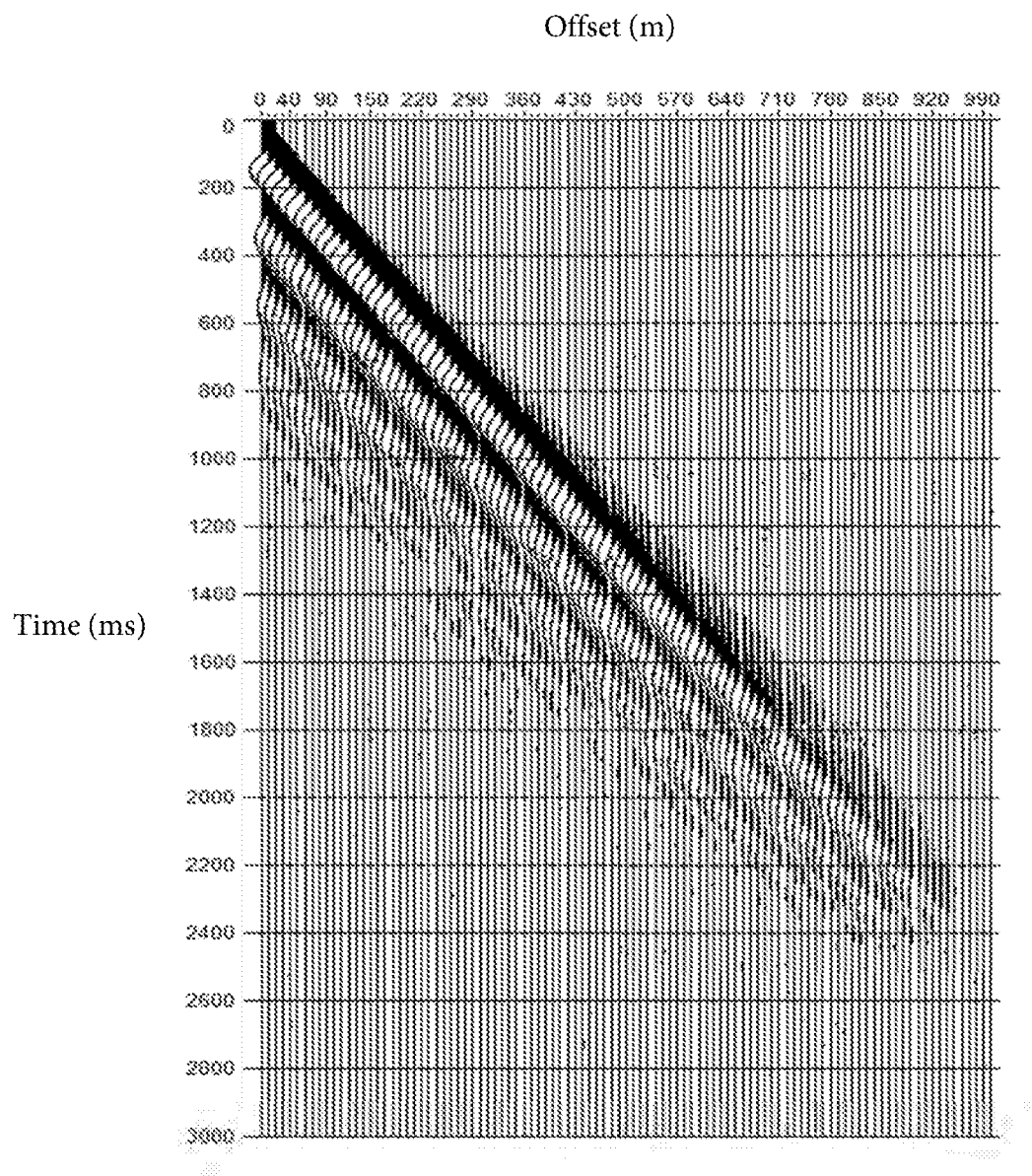
FIG. 15b is a ground roll energy separated from R-component according to the embodiment of the present disclosure.
Figure 16A:
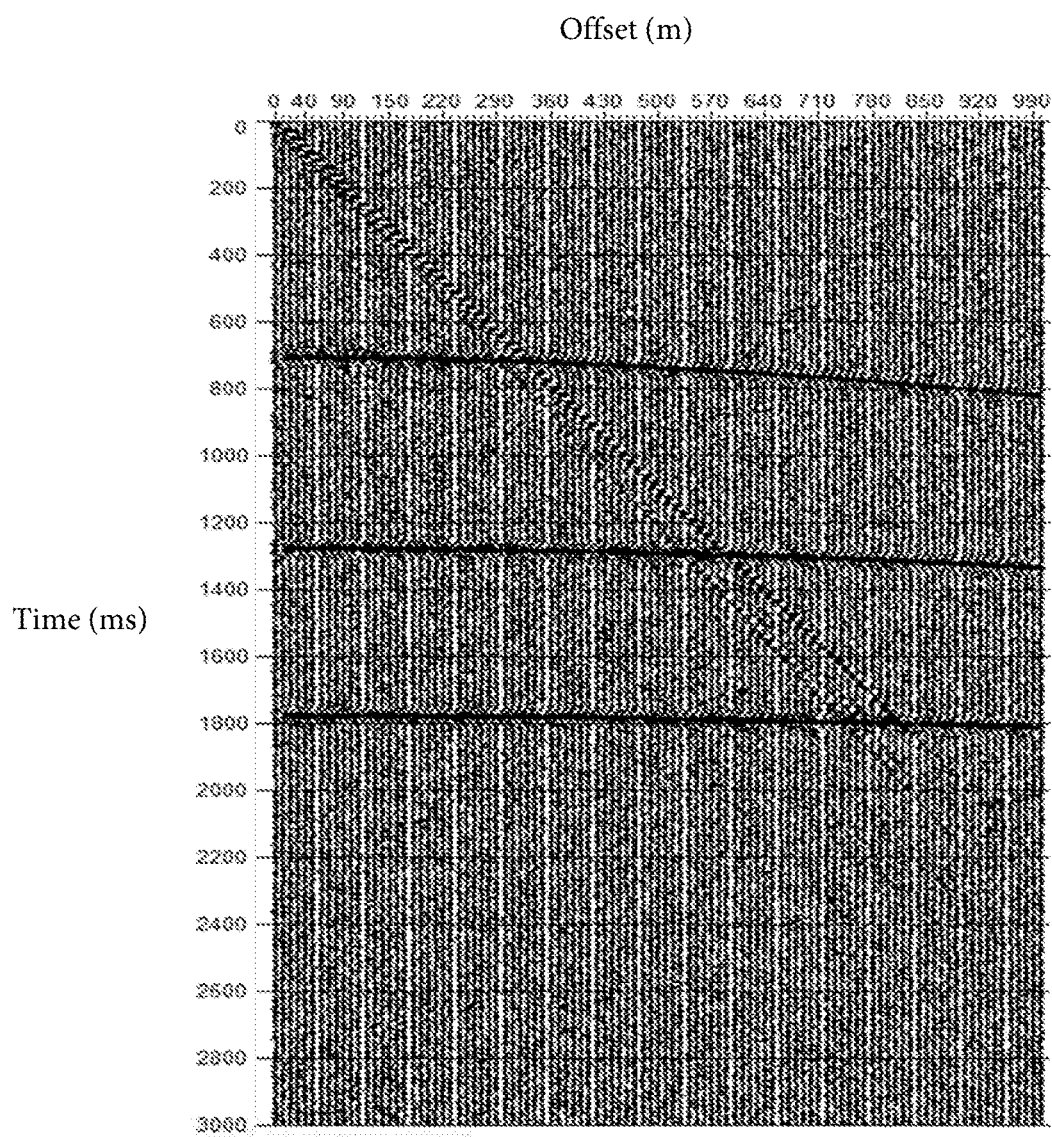
FIG. 16a is a synthetic shot record after attenuating the ground roll energy of Z-component according to the embodiment of the present disclosure.
Figure 16B:
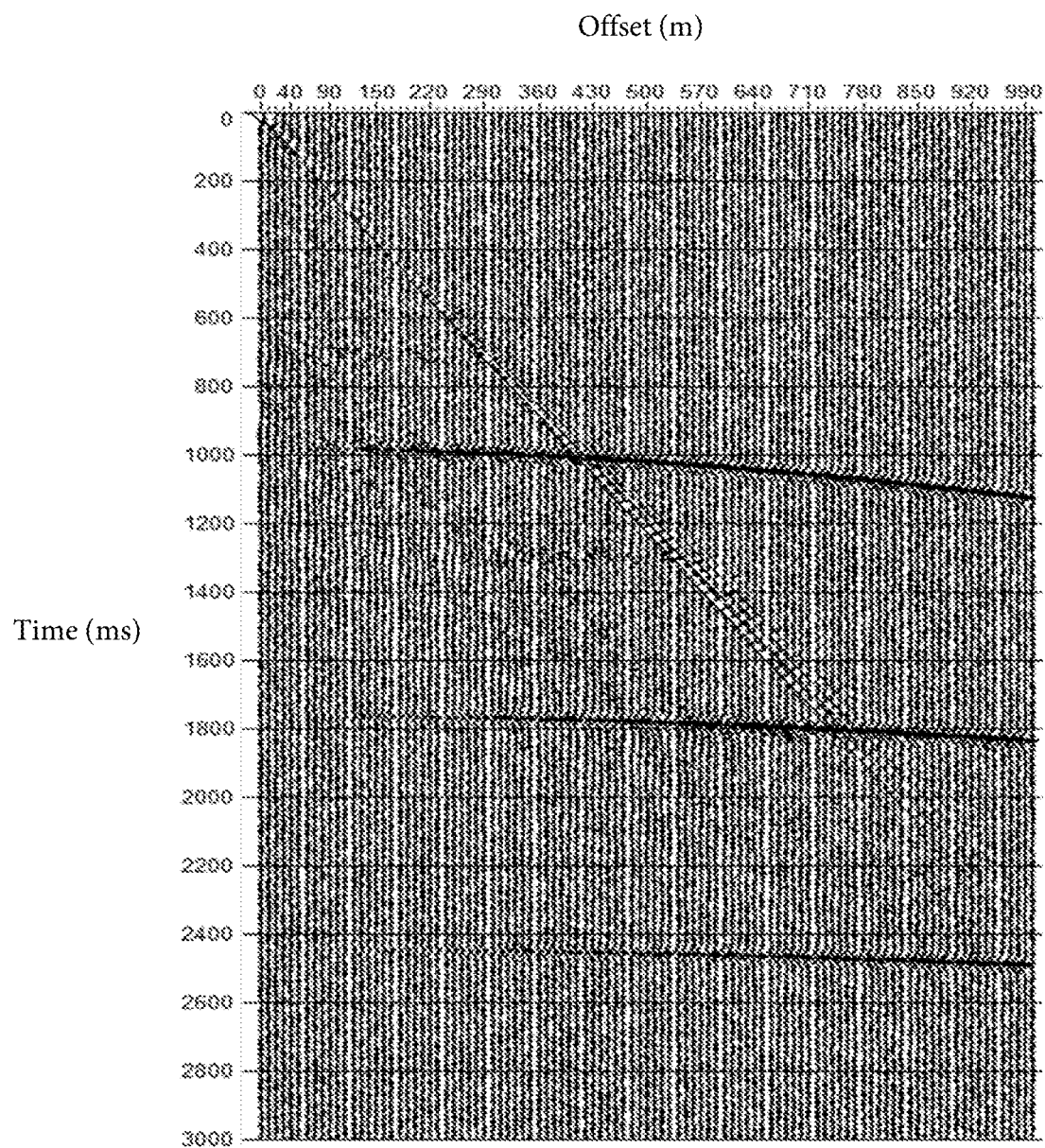
FIG. 16b is a synthetic shot record after attenuating the ground roll energy of R-component according to the embodiment of the present disclosure.

Firstly, a 50-ms moving time window is selected, and the ground roll wave is separated between semi apparent period of the 30 Hz Ricker wavelet and semi apparent period of the ground roll wave. FIG. 14 is a wave vector modulus calculated from the synthetic shot record in 50-ms moving time window according to the embodiment of the present disclosure. As shown in FIG. 14, the wave vector modulus calculated from the synthetic shot record in 50-ms moving time window mainly reflects the ground roll wave energy, but the effective signal and the random noise are greatly suppressed. FIG. 15a is a ground roll energy separated from Z-component according to the embodiment of the present disclosure. FIG. 15b is a ground roll energy separated from R-component according to the embodiment of the present disclosure. FIG. 16a is a synthetic shot record after attenuating the ground roll energy of Z-component according to the embodiment of the present disclosure. FIG. 16a is a synthetic shot record after attenuating the ground roll energy of R-component according to the embodiment of the present disclosure. In FIG. 15a, FIG. 15b, FIG. 16a and FIG. 16b, it shows that the ground roll energy is effectively separated from the synthetic shot record without damaging the effective signal. Additionally, after attenuating the ground roll energy, the coherent noise related to linear non-ground roll may be distinguished.

Figure 17:
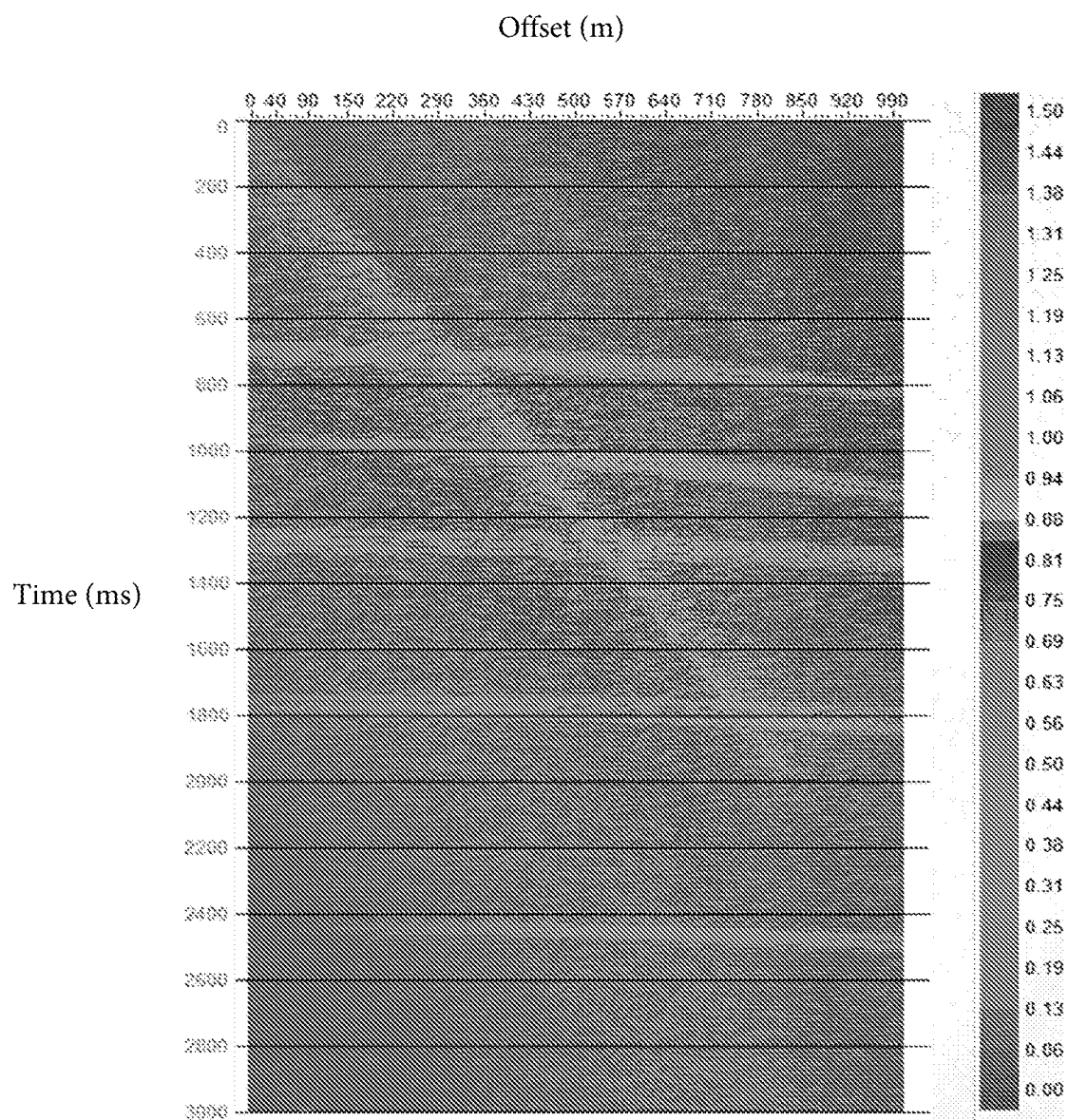
FIG. 17 is a wave vector modulus calculated from the synthetic shot record after attenuating the ground roll energy according to the embodiment of the present disclosure.
Figure 18A:
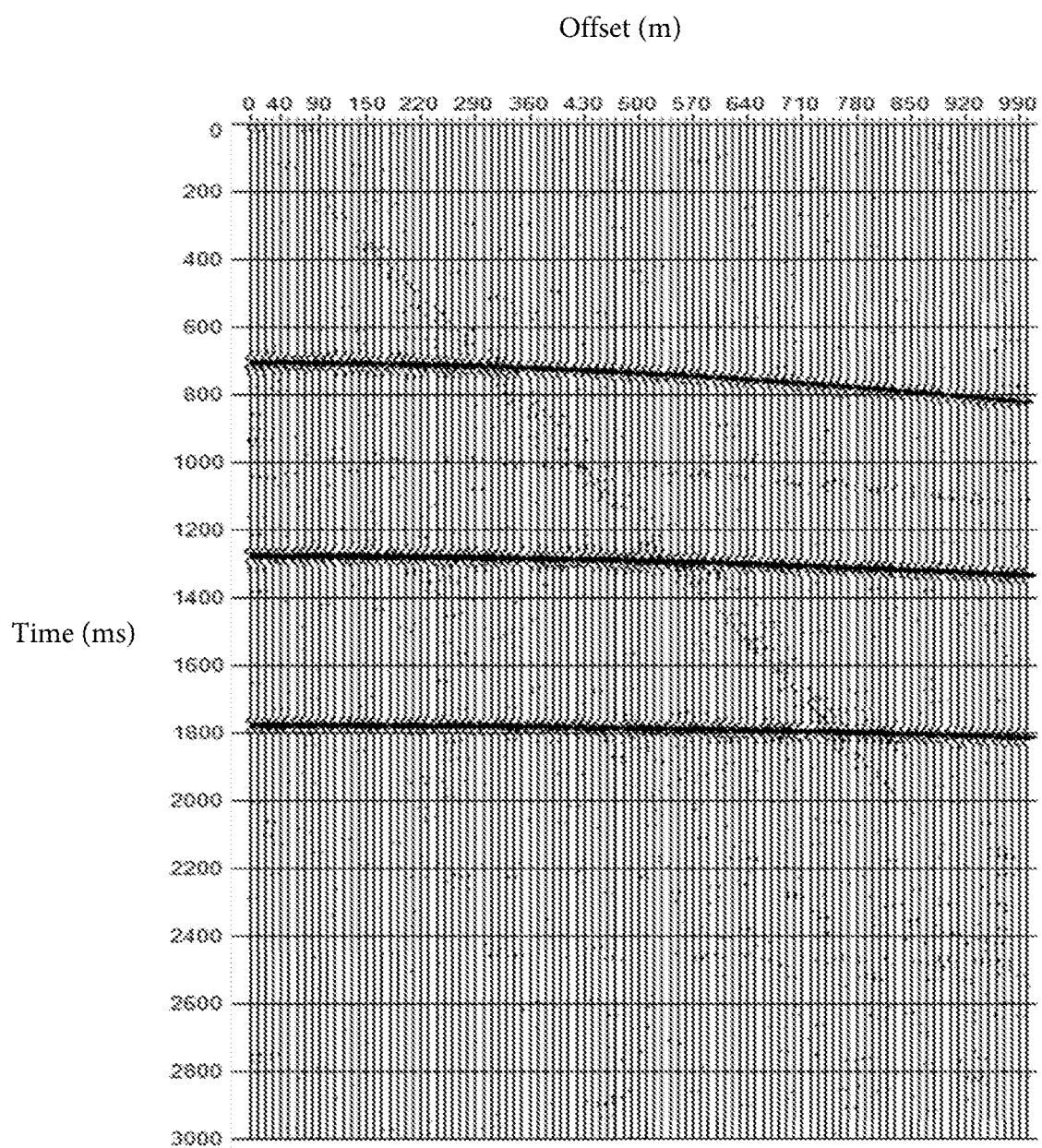
FIG. 18a is a final shot record filtered in Z-component according to the embodiment of the present disclosure.
Figure 18B:
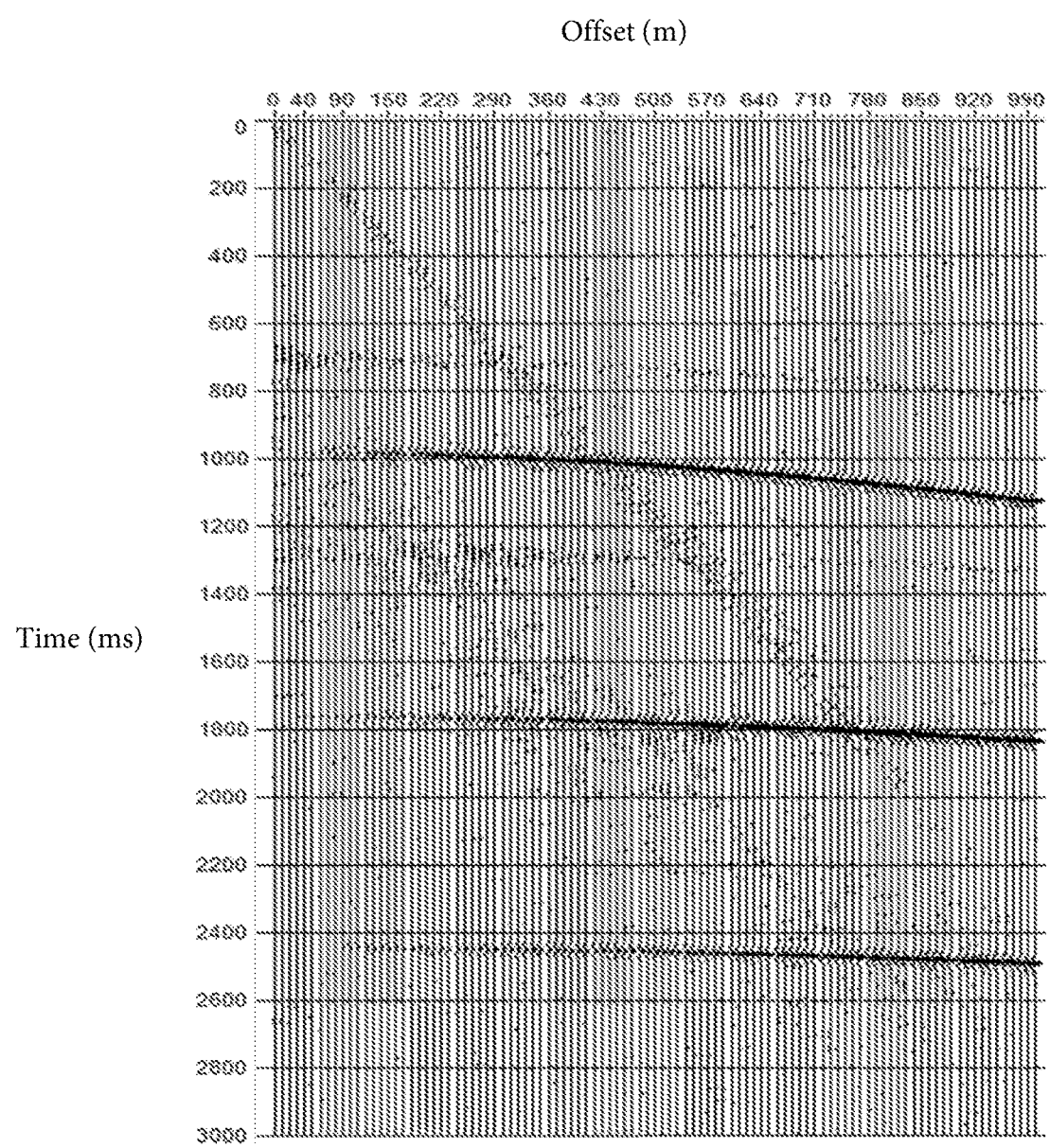
FIG. 18b is a final shot record filtered in R-component according to the embodiment of the present disclosure.
Figure 19A:
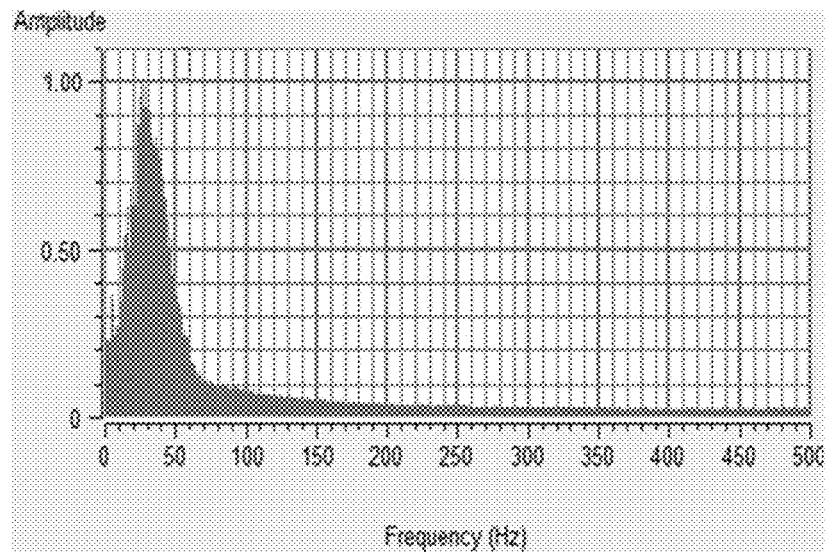
FIG. 19a is a spectrum of the final shot record filtered in Z-component according to the embodiment of the present disclosure.
Figure 19B:
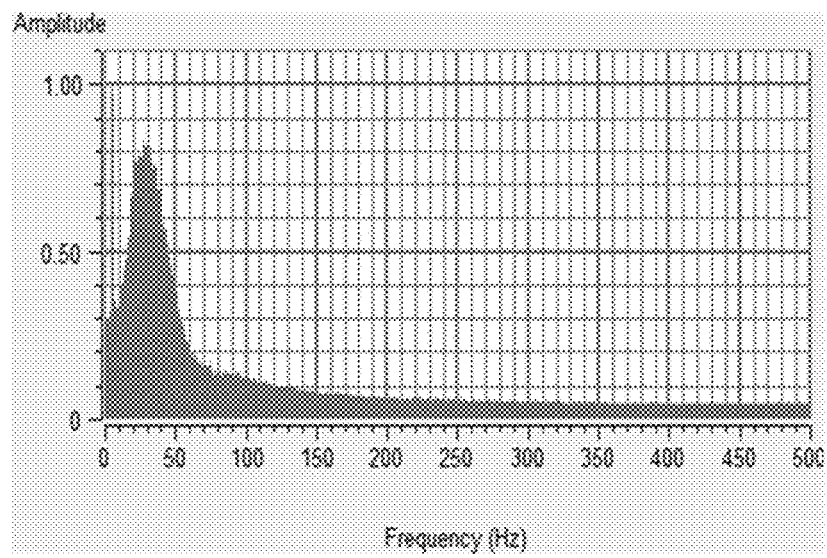
FIG. 19b is a spectrum of the final shot record filtered in R-component according to the embodiment of the present disclosure.
Figure 20A:
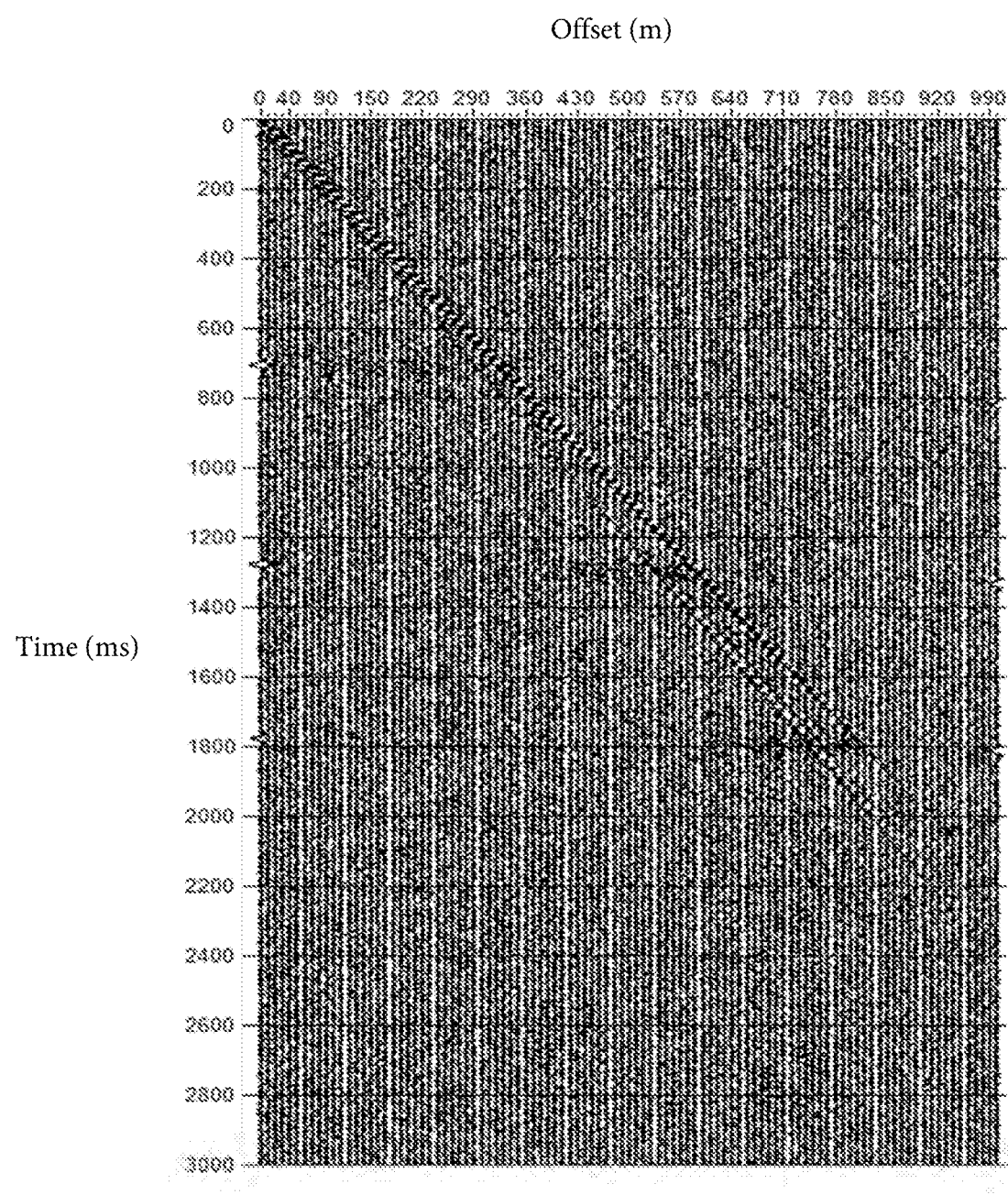
FIG. 20a is a random noise and other coherent noises separated from Z-component according to the embodiment of the present disclosure.
Figure 20B:
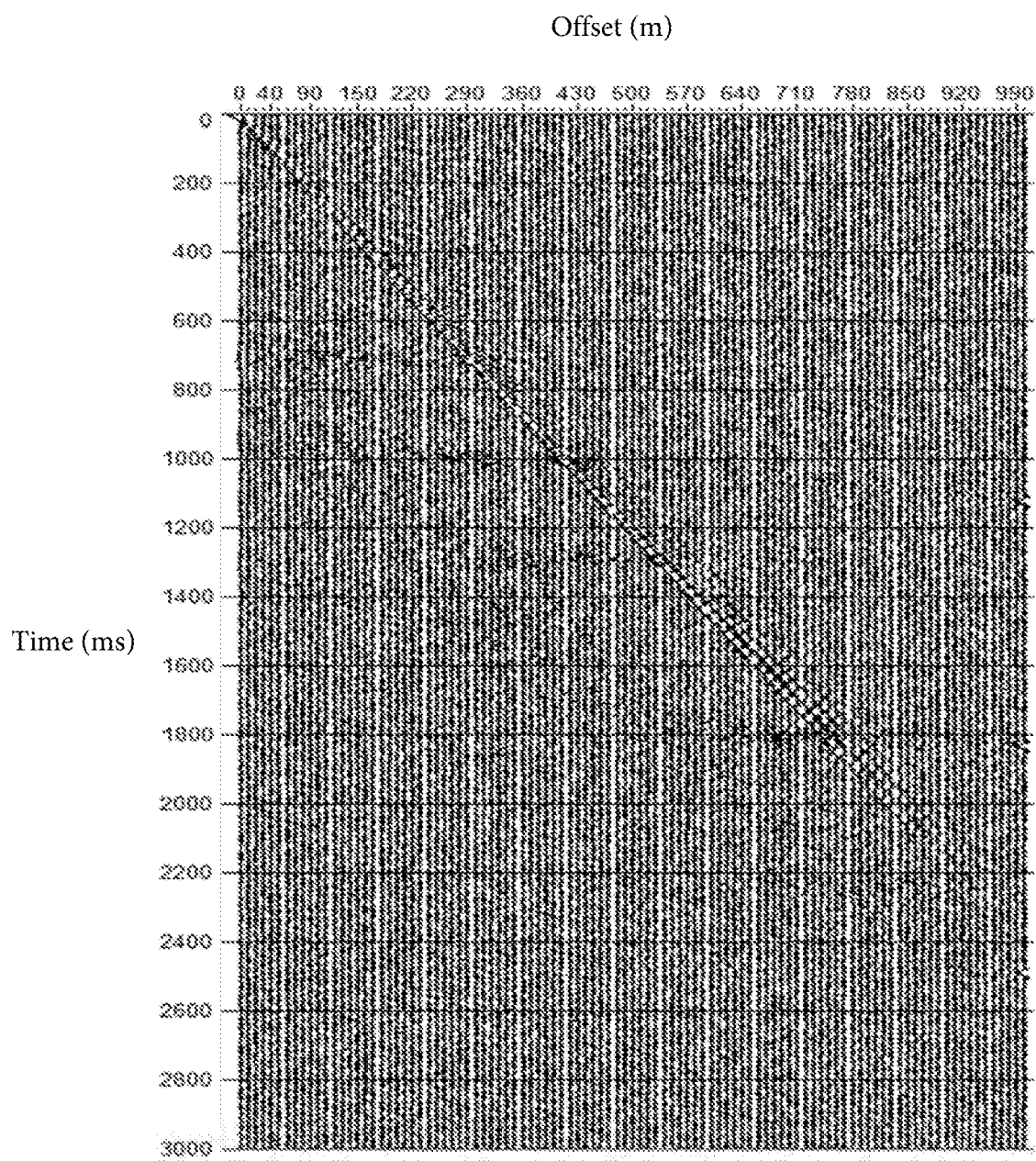
FIG. 20b is a random noise and other coherent noises separated from R-component according to the embodiment of the present disclosure.

Second, a 5-ms moving time window is selected. The smoothing approach of the first stage and the second stage is performed for the synthetic shot record after attenuating the ground roll energy, and in the third state, a three-trace moving trace window is selected. FIG. 17 is a wave vector modulus calculated from the synthetic shot record after attenuating the ground roll energy according to the embodiment of the present disclosure. As shown in FIG. 17, the filter parameters contribute to highlight the wave vector modulus of the effective signal under the random noise context. FIG. 18a is a final shot record filtered in Z-component according to the embodiment of the present disclosure. FIG. 18b is a final shot record filtered in R-component according to the embodiment of the present disclosure. FIG. 19a is a spectrum of the final shot record filtered in Z-component according to the embodiment of the present disclosure. FIG. 19b is a spectrum of the final shot record filtered in R-component according to the embodiment of the present disclosure. As shown in the final filtering result (FIG. 18a and FIG. 18 b) and the corresponding spectrum (FIG. 19a and FIG. 19b), the vector denoising method of the embodiment is effective and may maintain the high frequency and low frequency parts of the effective signal. FIG. 20a is a random noise and other coherent noises separated from Z-component according to the embodiment of the present disclosure. FIG. 20b is a random noise and other coherent noises separated from R-component according to the embodiment of the present disclosure. As shown in FIG. 20a and FIG. 20b, the random noise and other coherent noises are greatly filtered, and does not interfere the effective signal.

Figure 21A:
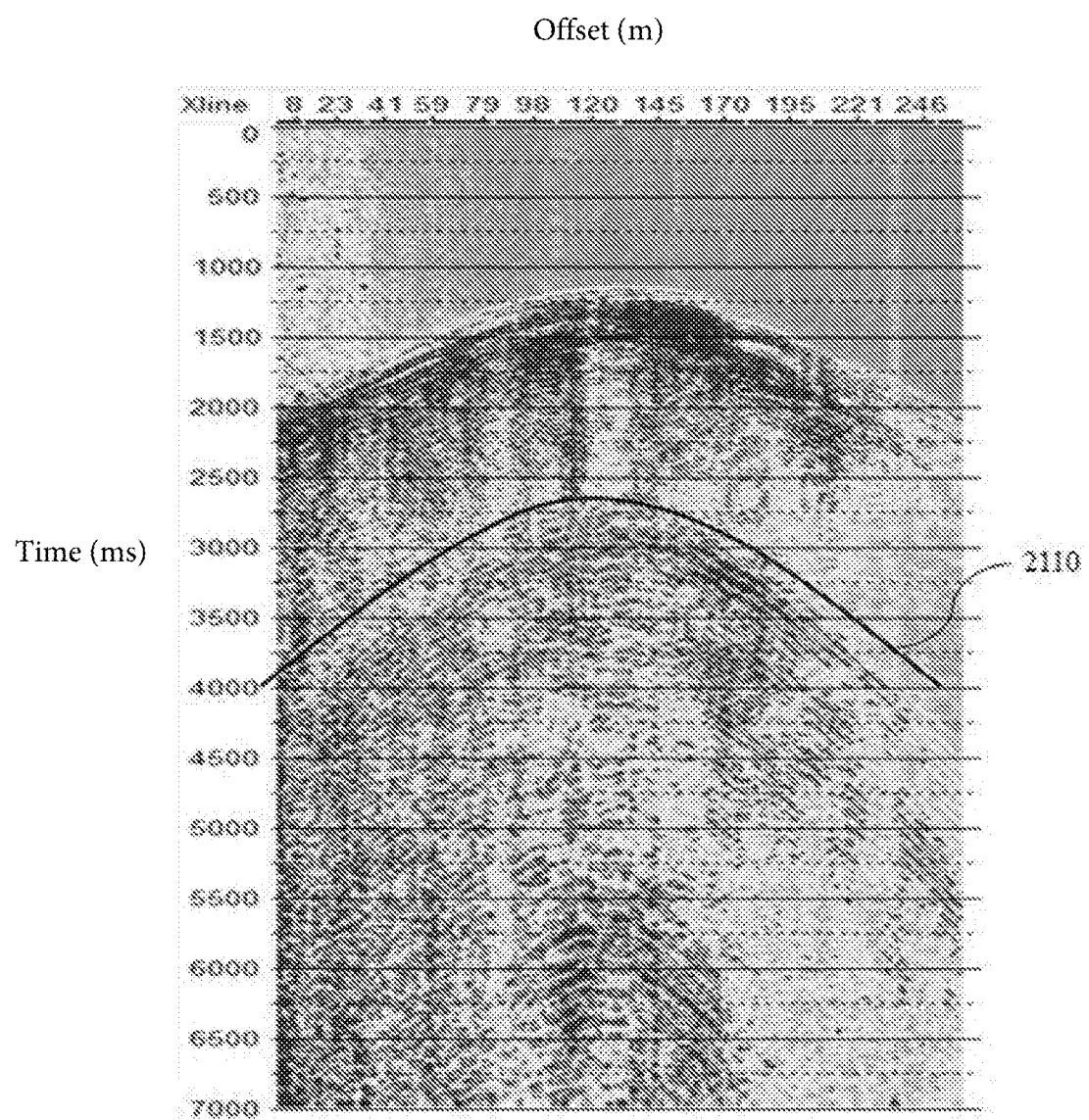
FIG. 21a is a wave vector modulus calculated from the live shot record in 80-ms moving time window according to the embodiment of the present disclosure.
Figure 21B:
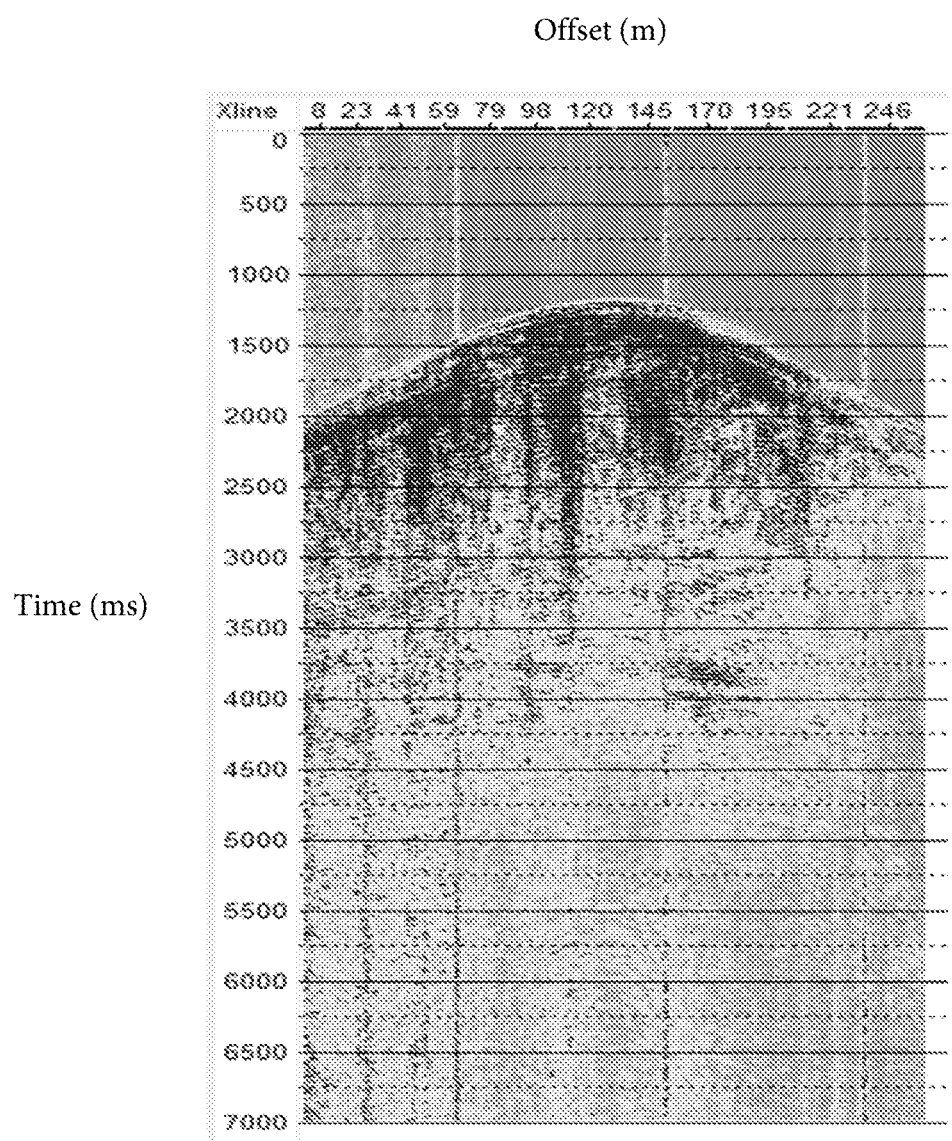
FIG. 21b is a wave vector modulus calculated from the live shot record after attenuating the ground roll energy according to the embodiment of the present disclosure.

The vector denoising method of the embodiment is applied to field 3D3C data acquired from the Xinchang gas field in the Sichuan Basin, Southwest China. FIG. 21a is a wave vector modulus calculated from the live shot record in 80-ms moving time window according to the embodiment of the present disclosure. FIG. 21b is a wave vector modulus calculated from the live shot record after attenuating the ground roll energy according to the embodiment of the present disclosure. As shown in FIG. 21a, the 80-ms moving time window may well highlight the wave vector modulus of the ground roll wave, but the wave vector modulus of the first arrivals in the shallow layer is also highlighted. Therefore, the ground roll energy attenuation is performed only for the data in the region under the curve shown by the reference number 2110 in FIG. 21a. In order to attenuating the random noise and other coherent noises, a 8-ms moving time window and a three-trace moving trace window are adopted.

Figure 22A:
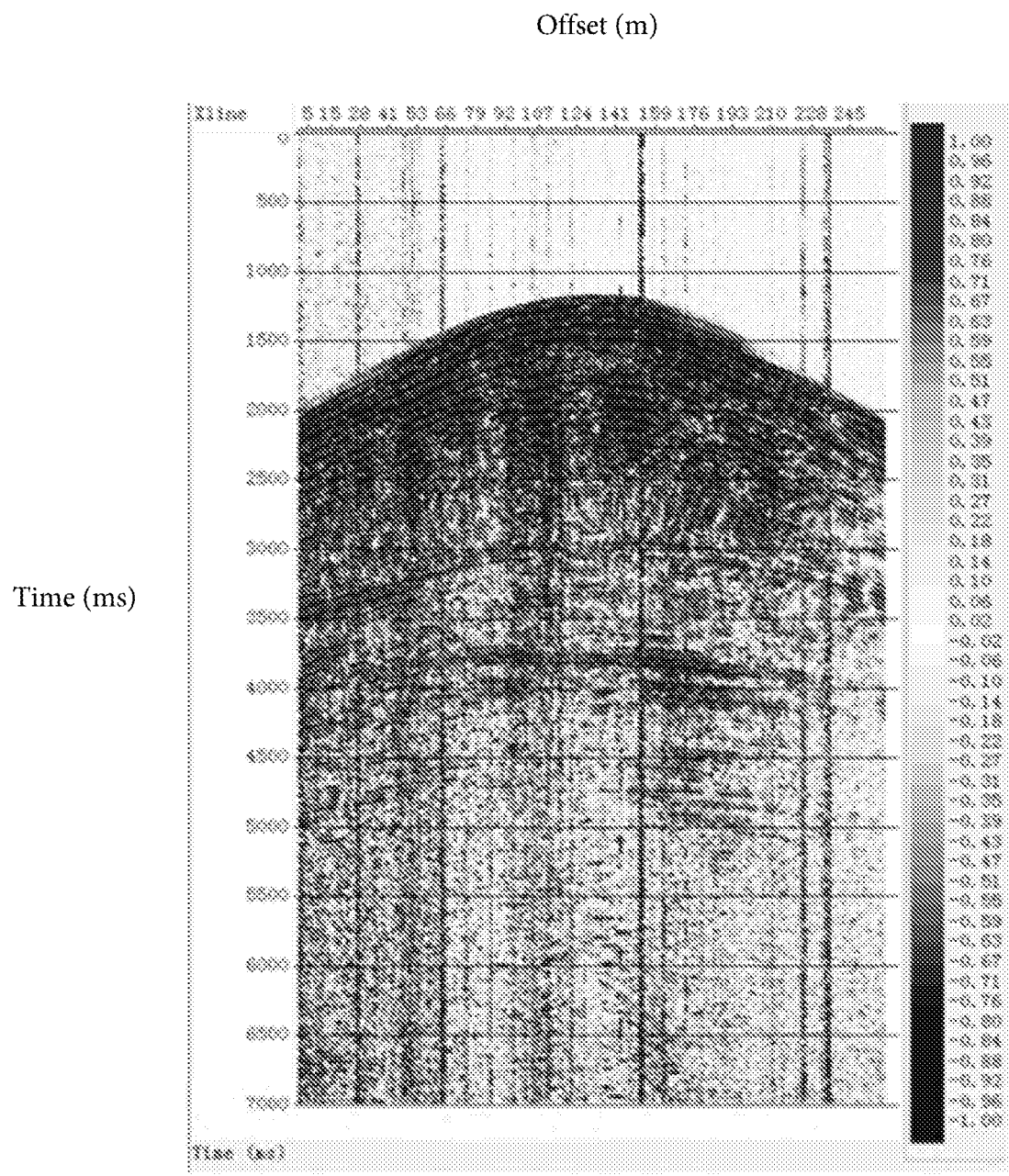
FIG. 22a is a schematic view of the original Z-component according to the embodiment of the present disclosure.
Figure 22B:
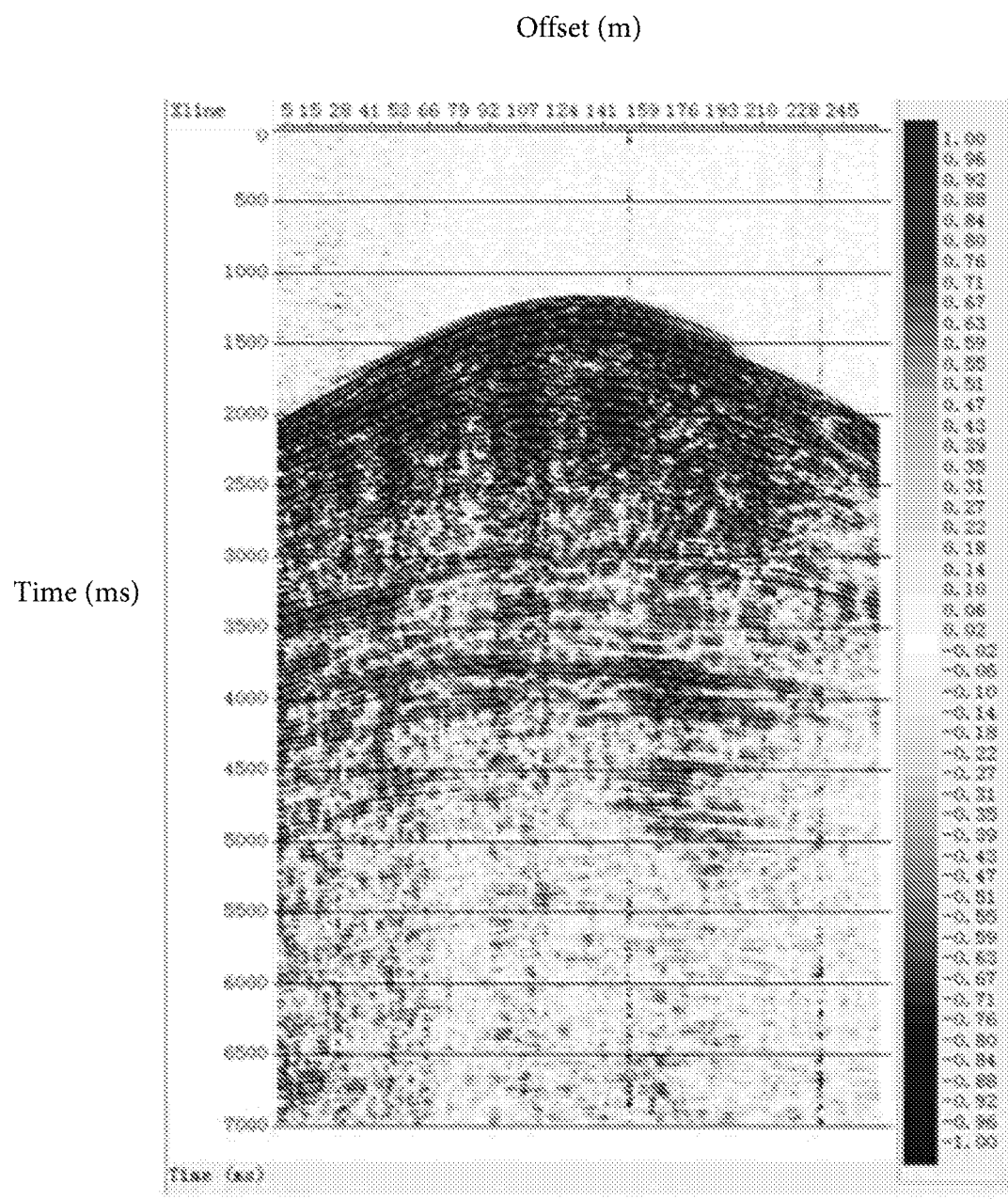
FIG. 22b is a schematic view of the filtered Z-component according to the embodiment of the present disclosure.
Figure 22C:
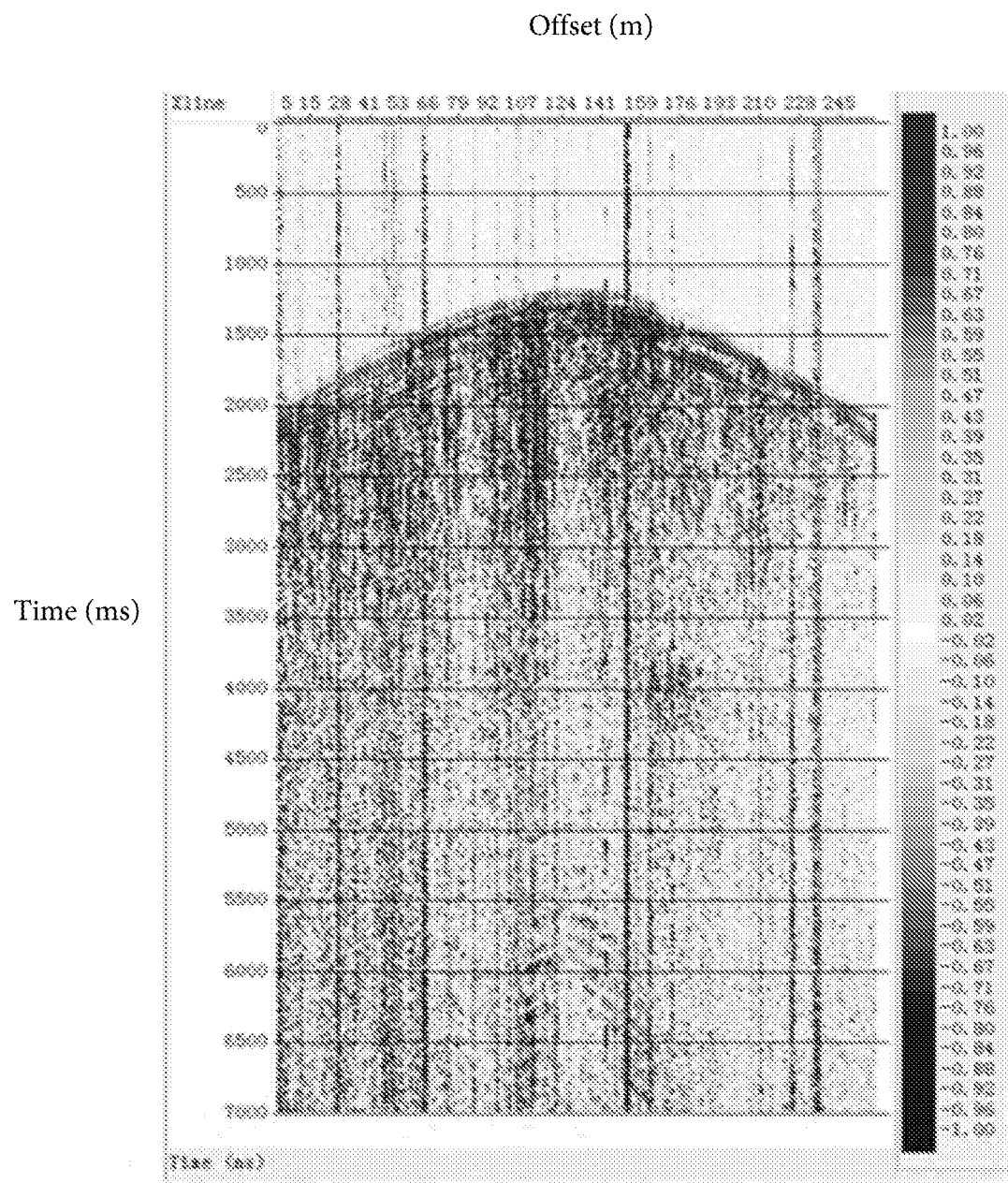
FIG. 22c is a schematic view of the noise separated from Z-component according to the embodiment of the present disclosure.
Figure 23A:
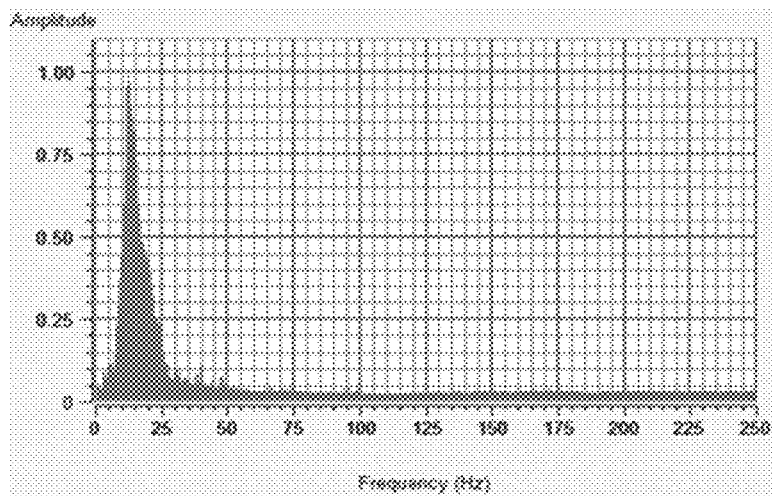
FIG. 23a is a spectrum of the original Z-component according to the embodiment of the present disclosure.
Figure 23B:
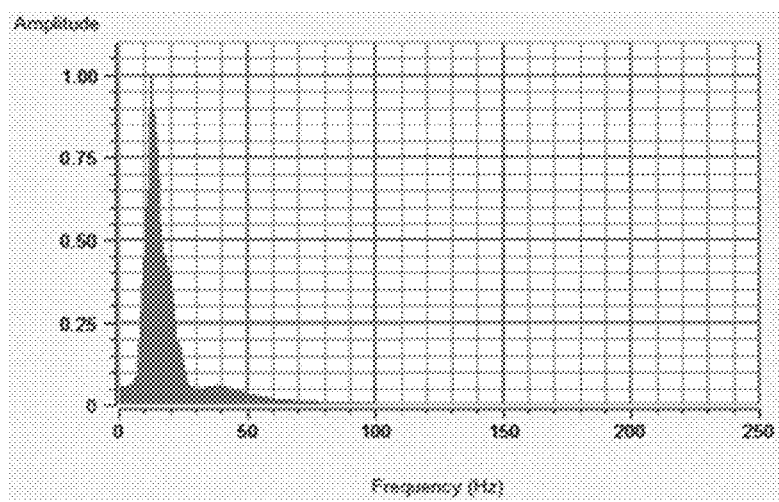
FIG. 23b is a spectrum of the filtered Z-component according to the embodiment of the present disclosure.
Figure 23C:
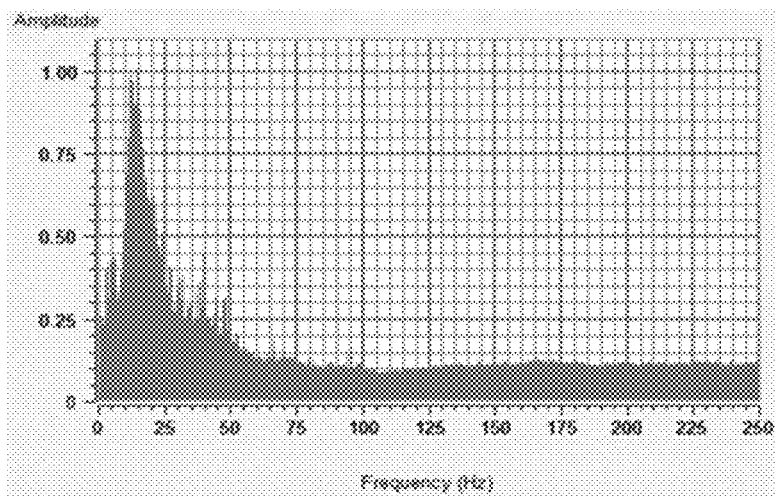
FIG. 23c is a spectrum of the noise separated from Z-component according to the embodiment of the present disclosure.
Figure 24A:
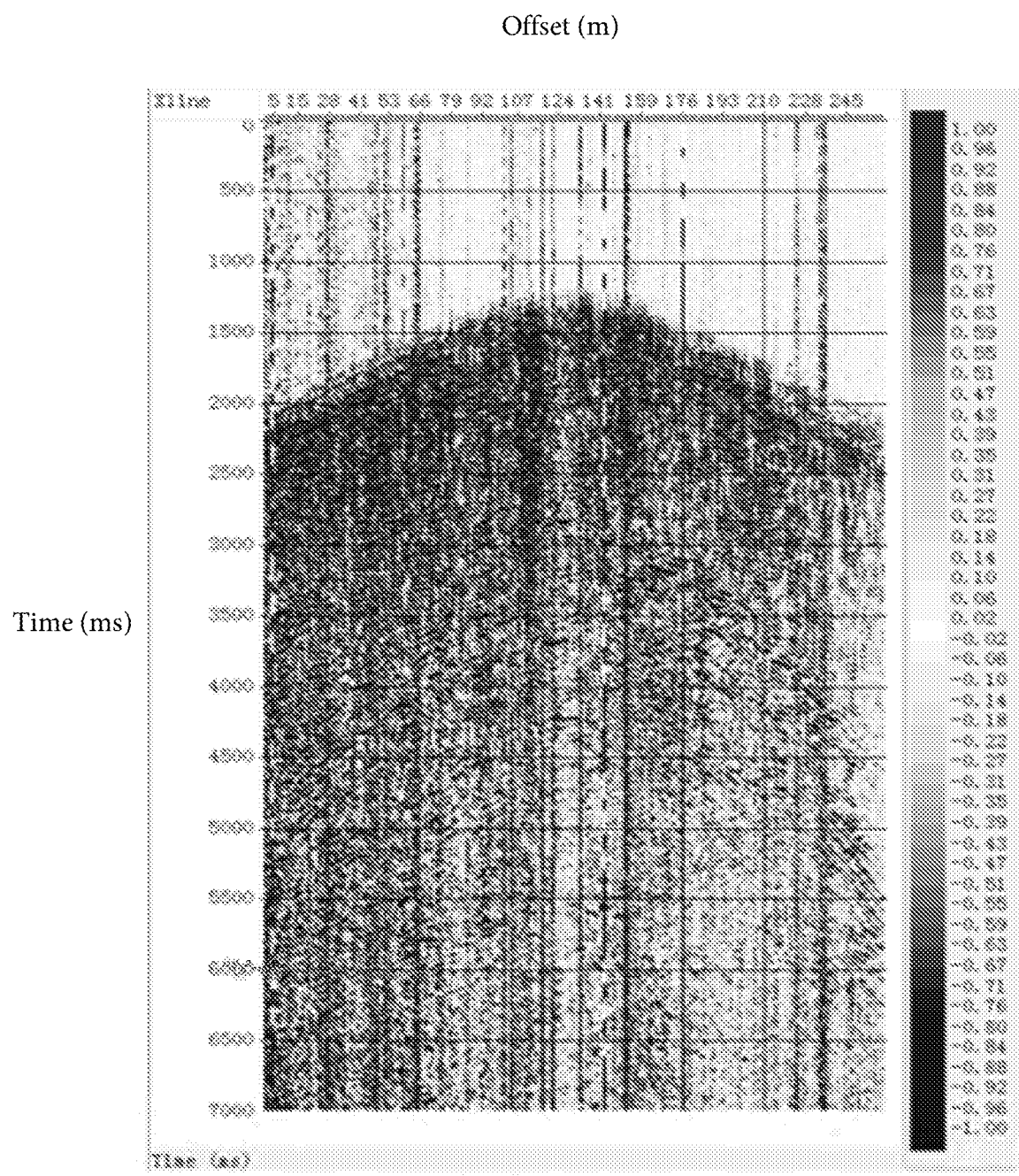
FIG. 24a is a schematic view of the original X-component according to the embodiment of the present disclosure.
Figure 24B:
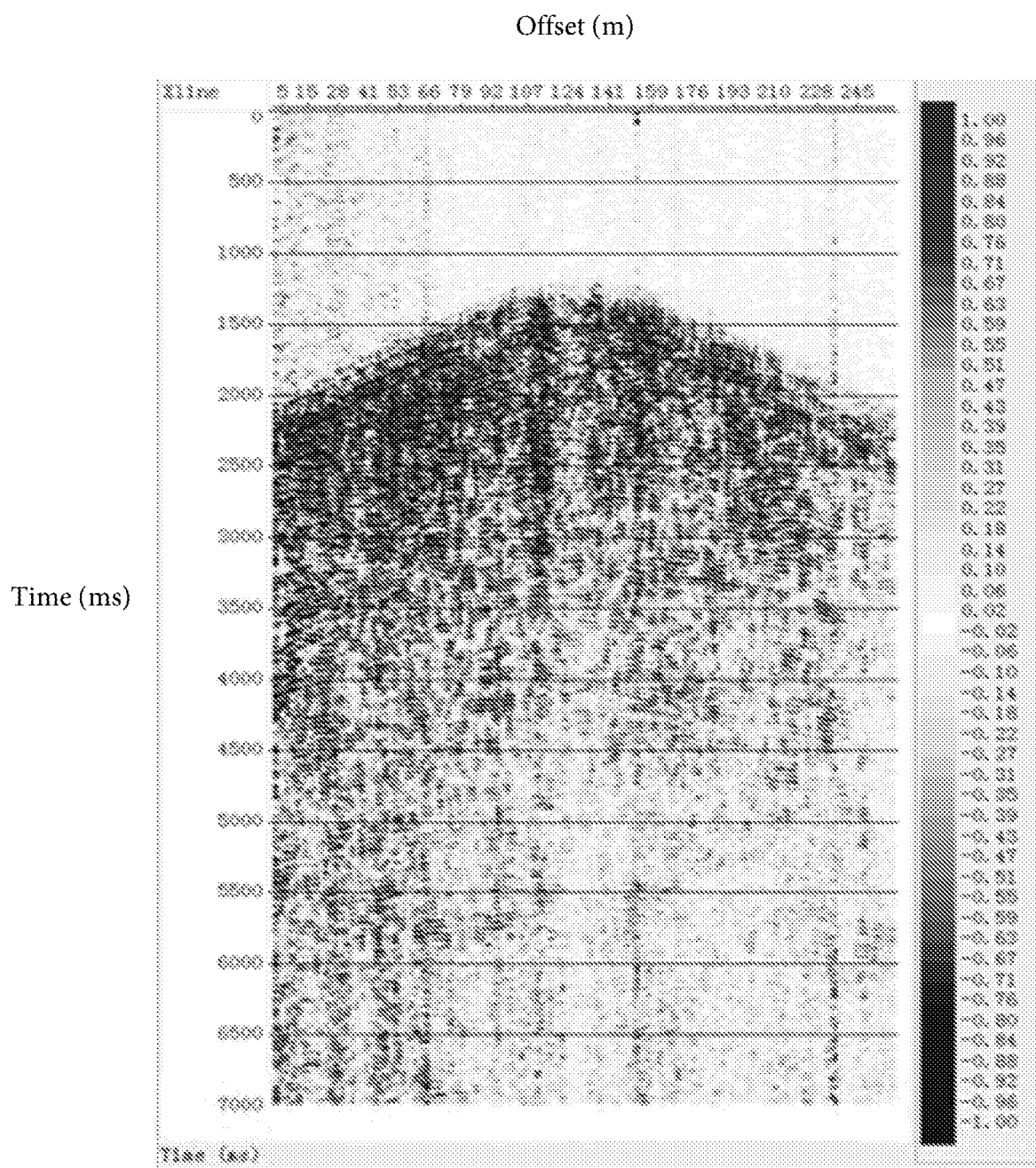
FIG. 24b is a schematic view of the filtered X-component according to the embodiment of the present disclosure.
Figure 24C:
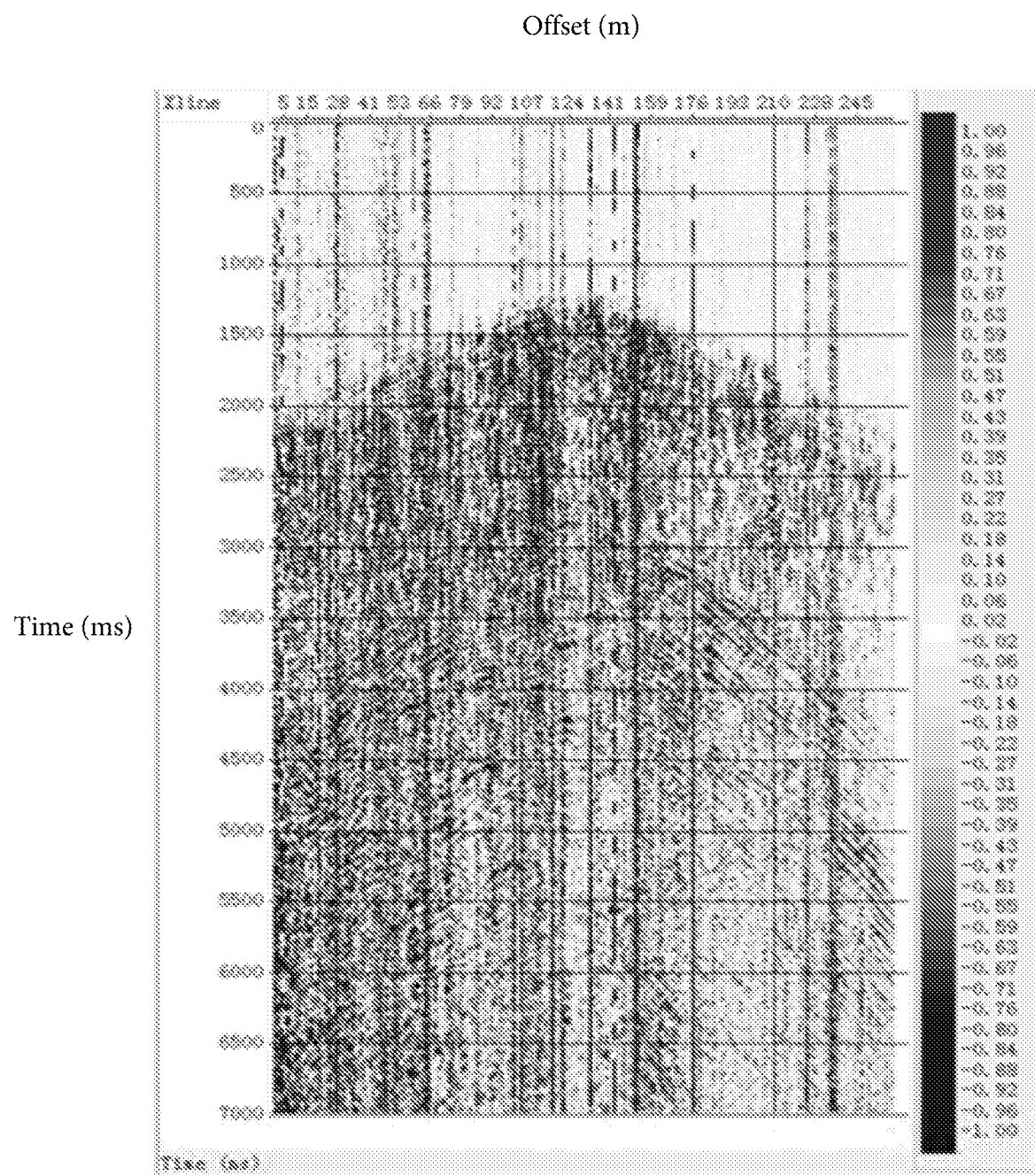
FIG. 24c is a schematic view of the noise separated from X-component according the embodiment of to the present disclosure.
Figure 25A:
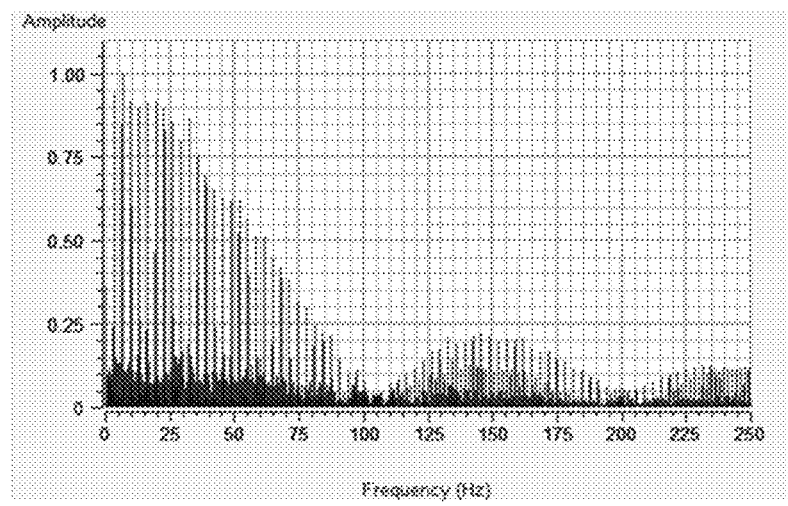
FIG. 25a is a spectrum of the original X-component according to the embodiment of the present disclosure.
Figure 25B:
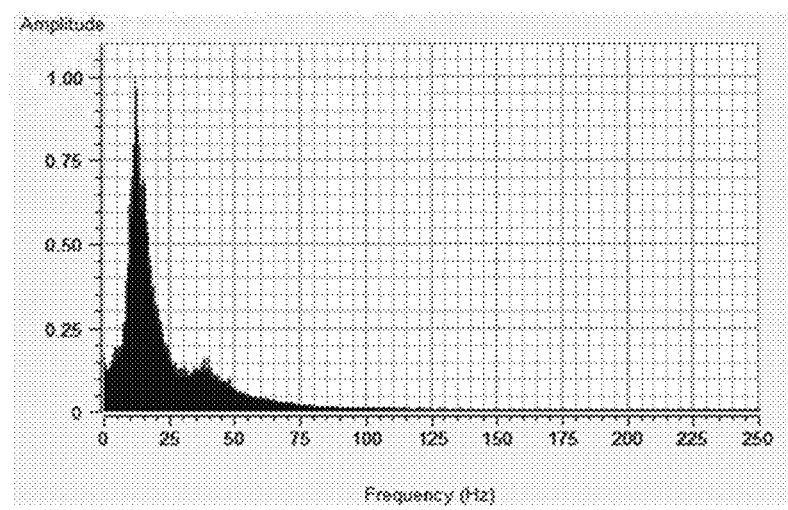
FIG. 25b is a spectrum of the filtered X-component according to the embodiment of the present disclosure.
Figure 25C:
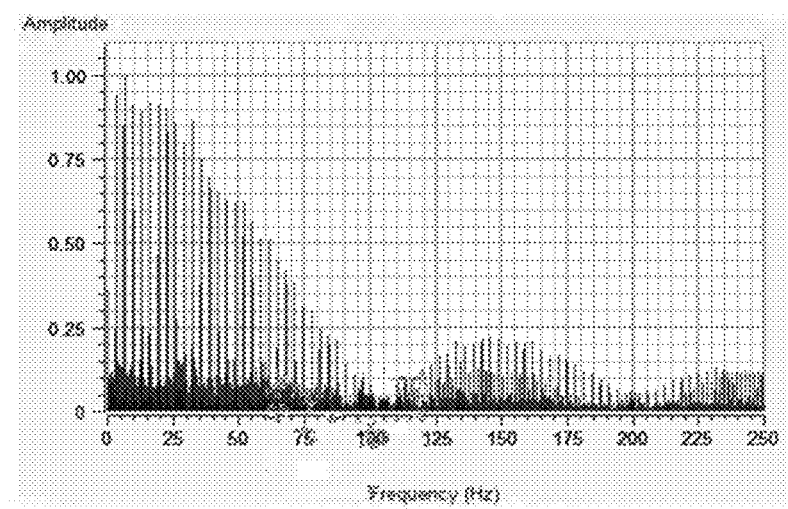
FIG. 25c is a spectrum of the noise separated from X-component according to the embodiment of the present disclosure.
Figure 26A:
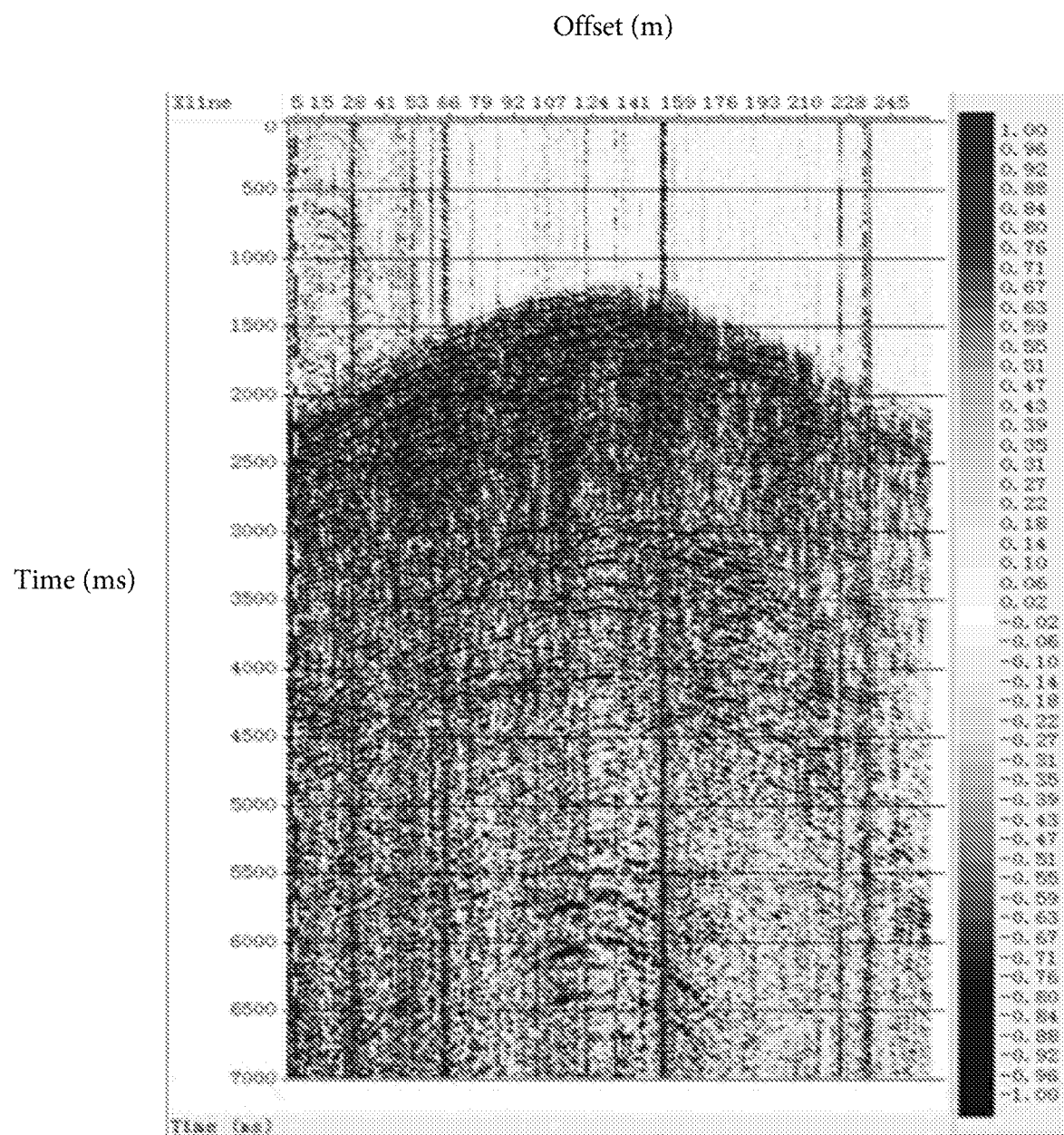
FIG. 26a is a schematic view of the original Y-component according to the embodiment of the present disclosure.
Figure 26B:
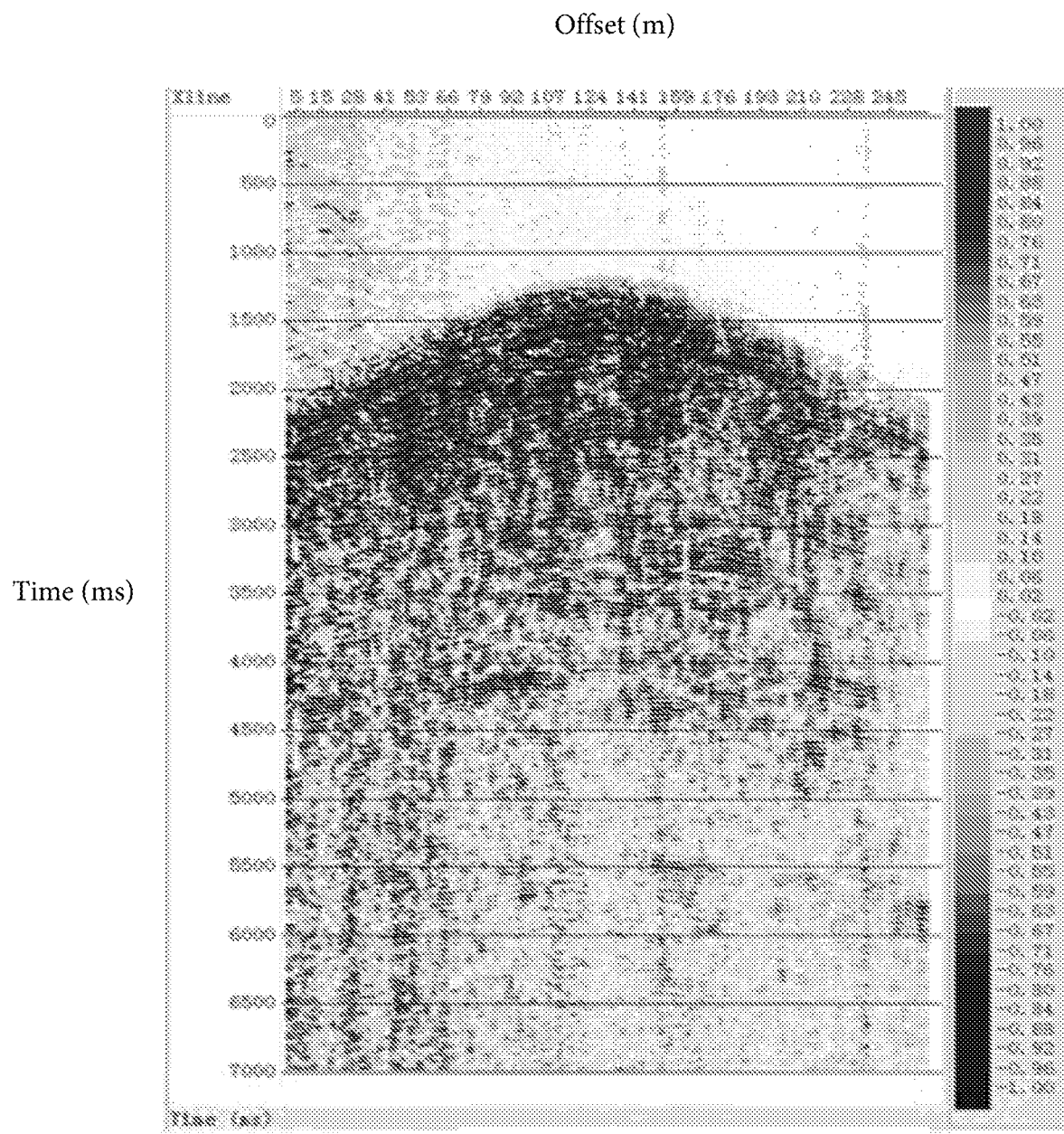
FIG. 26b is a schematic view of the filtered Y-component according to the embodiment of the present disclosure.
Figure 26C:
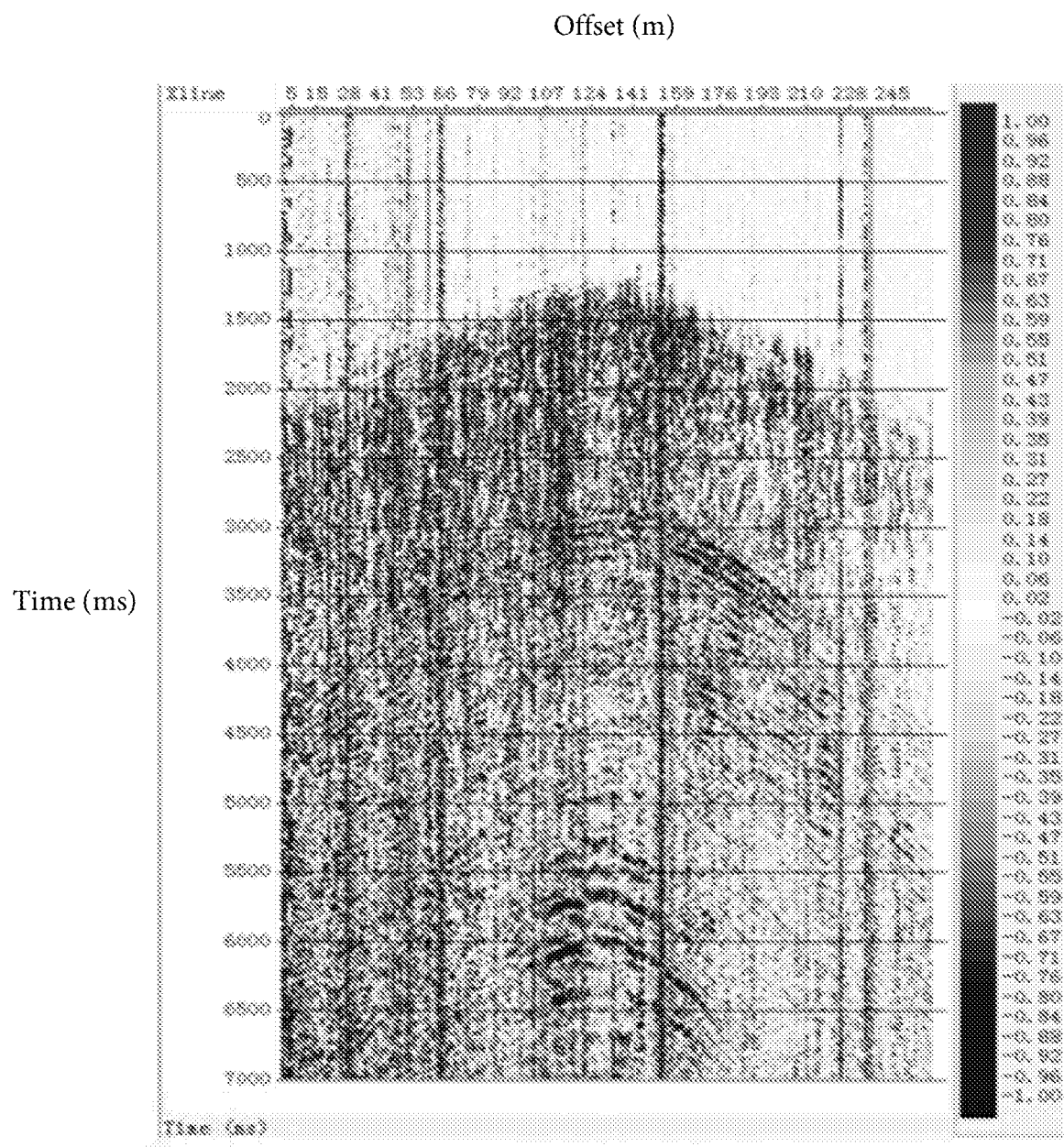
FIG. 26c is a schematic view of the noise separated from Y-component according to the embodiment of the present disclosure.
Figure 27A:
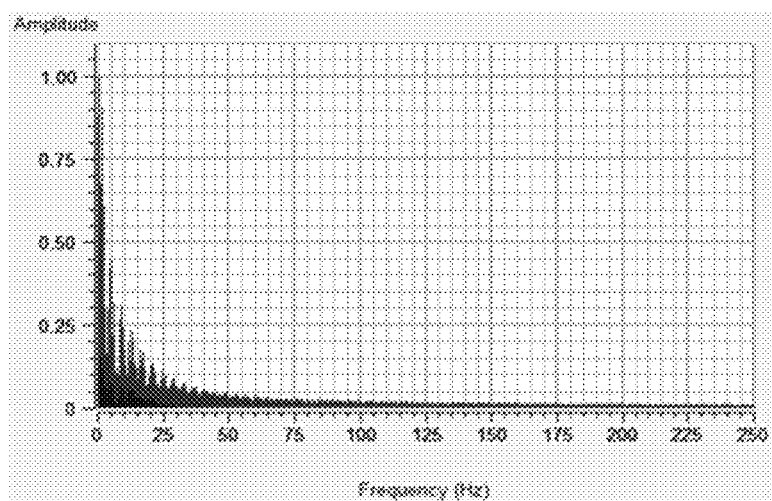
FIG. 27a is a spectrum of the original Y-component according to the embodiment of the present disclosure.
Figure 27B:
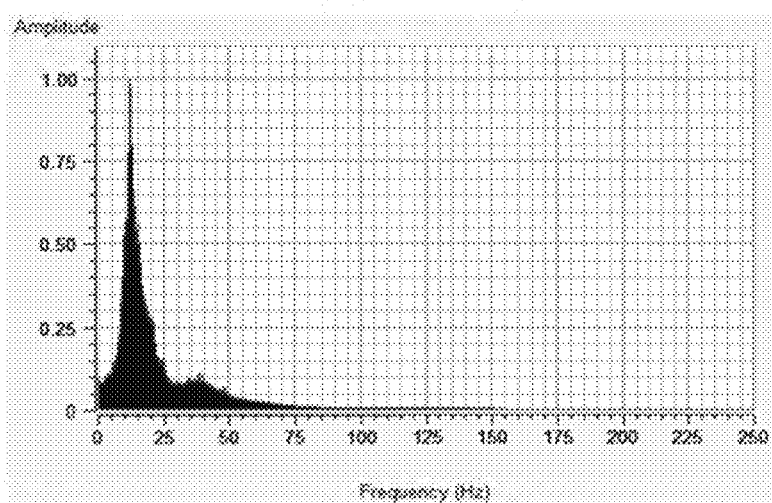
FIG. 27b is a spectrum of the filtered Y-component according to the embodiment of the present disclosure.
Figure 27C:
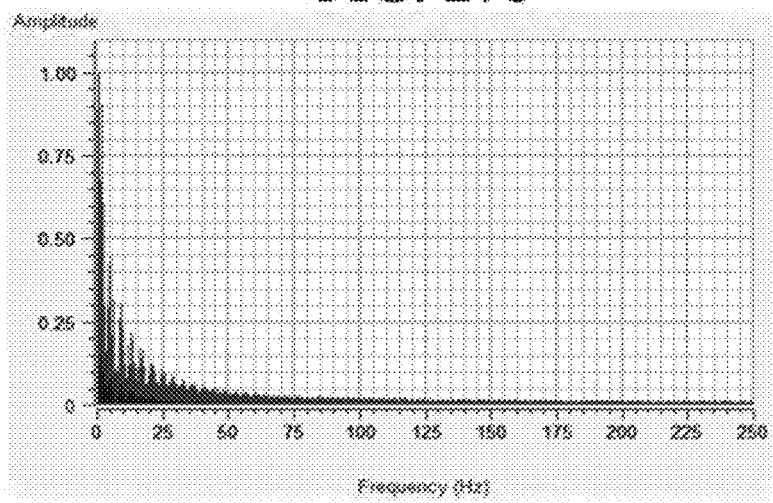
FIG. 27c is a spectrum of the noise separated from Y-component according to the embodiment of the present disclosure.

The vector denoising method of the embodiment may greatly suppress the ground roll energy and the random noise on Z-component (as shown in FIG. 22a, FIG. 22b and FIG. 22c) and the filtered noise is mainly wide frequency-band parts (as shown in FIG. 23a, FIG. 23b and FIG. 23c). However, some of the first arrivals on the Z-component are also filtered, which cause the frequency energy of the seismic primary to occur on the Z-component frequency spectrum (as shown in FIG. 23c). On the X-component (as shown in FIG. 24a, FIG. 24b, FIG. 24c and FIG. 25a, FIG. 25b, FIG. 25c), in addition to the ground roll and the random noise, noises such as outliers and single frequency interferences were also adequately suppressed. Of course, satisfied filtering results were also found on the T-component (as shown in FIG. 26a, FIG. 26b, FIG. 26c and FIG. 27a, FIG. 27b, FIG. 27c). Overall, the vector denoising method of the embodiment may effectively suppress the ground roll energy and the random noise and maintain the effective signal amplitudes.

In summary, the present disclosure involves calculating a first mean wave vector for the wave vector of the multicomponent seismic data by applying a first moving window, performing a median filtering for the first mean wave vector to obtain a true modulus of the ground roll wave, and subtracting the true modulus of the ground roll wave from the wave vector of the multicomponent seismic data to obtain a vector time-series and performing a mean filtering for the vector time-series by using a second moving window to obtain a second mean wave vector, and performing a median filtering for the second mean wave vector and performing a median the median filtering for the second mean wave vector within the same receiving line to suppress the wave vector of the random noise in the vector time-series, thereby obtaining a wave vector of a purified effective signal vector. Therefore, under the situation without relying on ellipticity and directionality, and without requiring setting up any kind of data covariance matrices or complex traces, the noise in the wave vector of the multicomponent seismic data may be greatly suppressed without damaging the high and low frequencies of the effective signal.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A vector denoising method that removes noise while maintaining effective signal amplitudes for multicomponent seismic data from a seismic source recorded by a multicomponent geophone, comprising:

obtaining wave vectors of the multicomponent seismic data by the multicomponent geophone, wherein the multicomponent seismic data includes a Z component, a R component, and a T component, wherein at least one wave vector of the wave vectors of the multicomponent seismic data comprises a composite vector having an effective signal wave vector, a ground roll wave vector and a random noise wave vector;

calculating a first mean wave vector of the at least one wave vector of the multicomponent seismic data by applying a first moving window by a processor, performing a first median filtering of the first mean wave vector to obtain a true modulus of the ground roll wave vector, and subtracting the true modulus of the ground roll wave vector from the at least one wave vector of the multicomponent seismic data to obtain a vector time-series, and wherein the vector time-series includes the effective signal wave vector and the random noise wave vector, and the vector time-series is ground roll wave vector free; and performing a mean filtering of the vector time-series by using a second moving window to obtain a second mean wave vector by the processor, and performing a second median filtering of the second mean wave vector and performing a third median filtering of the second mean wave vector within a same seismic receiving line to suppress the random noise wave vector in the vector time-series, thereby obtaining a wave vector of a purified effective signal vector for reservoir prediction and fluid detection.

2. The vector denoising method according to claim 1, wherein the first moving time window includes a length having a lower limitation that is a half of a maximum apparent period of the effective signal wave vector, and the length of the first moving time window is less than a half of a minimum apparent period of the ground roll wave vector.

3. The vector denoising method according to claim 1, wherein the second moving time window includes a length set to a quarter of a seismic wavelet sidelobe.

4. The vector denoising method according to claim 1, wherein the at least one wave vector of the multicomponent seismic data satisfies the following Equation:

$$A(t)=B(t)+G(t)+N(t),$$

wherein t denotes time, B(t), G(t) and N(t) the effective signal wave vector, the ground roll wave vector, and the random noise wave vector at t time respectively.

5. The vector denoising method according to claim 4, wherein the first mean wave vector satisfies the follow Equation:

$$K_j = \frac{A(t-T_1/2+j\Delta t) + A(t+T_1/2-j\Delta t)}{2}, j=0,\ldots,\frac{T_1}{2\Delta t},$$

wherein $K_j$ denotes the first mean wave vector, $T_1$ denotes the first moving time window, $\Delta t$ denotes a time sampling rate of the seismic data, wherein performing the first median filtering of the first mean wave vector satisfies the following Equation:

$$M(t)=\mathrm{argmin}(D(K_j)),$$

wherein M(t) denotes a median vector, $D(K_j)$ denotes a total distance of one vector to all other vectors in the first mean wave vector and satisfies the following Equation:

$$D(K_j) = \sum_{i=1}^{\frac{T_1}{2\Delta t}} \|K_j - K_i\|,$$

wherein the true modulus of the ground roll wave satisfies the following Equation:

$$G(t)=\gamma_1(t)M(t),$$

wherein $\gamma_1(t)$ denotes a first scaling factor.

6. The vector denoising method according to claim 5, wherein the second mean wave vector satisfies the following Equation:

$$M_1(t) = \frac{1}{T_2+1} \sum_{\tau=t-T_2/2}^{t+T_2/2} C(t),$$

wherein $M_1(t)$ denotes the second mean wave vector, $T_2$ denotes the second moving time window, C(t) denotes the vector time-series, wherein performing the second median filtering of the second mean wave vector and performing the third median filtering of the second mean wave vector within a same receiving line satisfies the following Equation:

$$M_2(t) = \mathrm{argmin}\left(\sum_{i=t-T_2/(2\Delta t)}^{t+T_2/(2\Delta t)} \|M_{1j} - M_{1i}\|\right), j=t-\frac{T_2}{2\Delta t},\ldots,t+\frac{T_2}{2\Delta t},$$

$$M_3(k) = \mathrm{argmin}\left(\sum_{i=k-K/(2\Delta k)}^{k+K/(2\Delta k)} \|M_{2j} - M_{2i}\|\right), j=k-\frac{K}{2\Delta k},\ldots,k+\frac{K}{2\Delta k},$$

wherein $M_2(t)$ denotes a first wave vector after suppressing the random noise, $M_3(k)$ denotes a second wave vector after suppressing a non-ground-roll wave related coherent noise, k denotes an output trace of the median filtering, K denotes a length of a moving trace window of the median filtering, and wherein the wave vector of the purified effective signal vector satisfies the following Equation:

$$B(t)=\gamma_2(t)M_3(t),$$

wherein $\gamma_2(t)$ denotes a second scaling factor.

* * * * *